(12) United States Patent
Mosko et al.

(10) Patent No.: US 7,835,351 B2
(45) Date of Patent: Nov. 16, 2010

(54) SELECTION OF INFORMATION FOR TRANSMISSION AND STORAGE IN AN AD-HOC NETWORK BASED UPON LOCAL SYNOPSIS EXCHANGE

(75) Inventors: Marc E. Mosko, Santa Cruz, CA (US); Daniel H. Greene, Sunnyvale, CA (US); Juan Liu, Milpitas, CA (US); James E. Reich, San Francisco, CA (US); Qingfeng Huang, San Jose, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 600 days.

(21) Appl. No.: 11/428,440

(22) Filed: Jul. 3, 2006

(65) Prior Publication Data
US 2008/0002635 A1    Jan. 3, 2008

(51) Int. Cl.
*H04L 12/28* (2006.01)
(52) U.S. Cl. .................... 370/389; 370/254; 455/91; 455/99; 709/238
(58) Field of Classification Search ................ 370/254
See application file for complete search history.

(56) References Cited

U.S. PATENT DOCUMENTS

| | | | |
|---|---|---|---|
| 6,580,981 B1 | 6/2003 | Masood et al. | |
| 6,721,537 B1 | 4/2004 | Briesmeister | |
| 2002/0030611 A1 | 3/2002 | Nuesser et al. | |
| 2002/0035554 A1 | 3/2002 | Katsuno et al. | |
| 2003/0187570 A1 | 10/2003 | Impson et al. | |
| 2004/0001476 A1* | 1/2004 | Islam et al. | 370/352 |
| 2004/0174844 A1 | 9/2004 | Cho et al. | |
| 2005/0002364 A1* | 1/2005 | Ozer et al. | 370/338 |
| 2005/0099983 A1 | 5/2005 | Nakamura et al. | |
| 2005/0138200 A1 | 6/2005 | Liu et al. | |
| 2006/0004702 A1 | 1/2006 | St. John et al. | |

(Continued)

FOREIGN PATENT DOCUMENTS

| | | |
|---|---|---|
| EP | 1087576 A | 3/2001 |
| EP | 1286507 A | 2/2003 |

OTHER PUBLICATIONS

Bachir et al: "A multicast protocol in ad hoc networks inter-vehicle geocast" VTC 2003-Spring. The 57th. IEEE Semiannual Vehicular Technology Conference. Proceedings. Jeju, Korea, Apr. 22-26, 2003, IEEE New York, NY: IEEE, US, vol. vol. 4 of 4. CONF. 57, Apr. 22, 2003, pp. 2456-2460.

(Continued)

*Primary Examiner*—Ayaz R Sheikh
*Assistant Examiner*—Nicholas Sloms
(74) *Attorney, Agent, or Firm*—Marger Johnson & McCollom, P.C.

(57) ABSTRACT

A method of managing traffic in an ad-hoc network includes receiving, at a local node, a received synopsis of data sample updates in a neighbor storage of a neighboring node, the synopsis being based at least in part on dynamic priorities associated with the data samples. The received synopsis is then compared with data sample updates in a local storage of the local node and the local node determines which data samples will be transmitted.

29 Claims, 13 Drawing Sheets

U.S. PATENT DOCUMENTS

2006/0072505 A1     4/2006    Carrillo et al.
2006/0077959 A1*   4/2006    Beckemeyer ............... 370/352
2008/0261580 A1*   10/2008   Wallentin et al. ........... 455/418

OTHER PUBLICATIONS

Hahner et al: "A protocol for data dissemination in frequently partitioned mobile ad hoc networks" Computers and Communication, 2003. (ISCC 2003). Proceedings. Eighth IEEE International Symposium on Jun. 30-Jul. 3, 2003, Piscataway, NJ, USA, IEEE 2003, pp. 633-640.

Little et al: "An Information propagation scheme for VANET's" Intelligent Transportation Systems, 2005. Proceedings. 2005 IEEE Vienna, Austria Sept. 13-16, 2005, Piscataway, NJ, USA IEEE, Sep. 13, 2005 pp. 155-160.

Peng et al: "Traffic Model for clustering algorithms in vehicular ad-hoc networks" Consumer Communications and Networking Conference, 2006. CCNC 2006. 2006 3rd IEEE Las Vegas, NV, USA Jan. 8-10, 2006, Piscataway, NJ, USA, IEEE, Jan. 8, 2006, pp. 168-172.

Saito et al: "Evaluation of Inter-Vehicle Ad Hoc Communication Protocol" Advanced Information Networkings and Applications, 2005. AINA 2005. 19th International Conference on Taipei, Taiwan USA, IEEE, Mar. 25, 2005. pp. 78-83.

Wischhof et al: "Congestion control in vehicular ad hoc networks" Vehicular Electronics and Safety, 2005. IEEE International Conference on Xi'An, China Oct. 14-16, 2005, Piscataway, NJ, USA, IEEE, Oct. 14, 2005, pp. 58-63.

Xu et al: "Opportunistic resource exchange in inter-vehicle ad-hoc networks" Mobile Data Management, 2004. Proceedings. 2004 IEEE International Conference on Berkeley, CA, USA Jan. 19-22, 2004, Los Alamitos, CA, USA, IEEE Comput. Soc, US, Jan. 19, 2004, pp. 4-12.

Meier, R. And Cahill, V., "Exploiting Proximity in Event-Based Middleware for Collaborative Mobile Applications," *Proc. Distributed Applications and Interoperable Systems*, 4$^{th}$ IFIP WG6.1 International Conference, 2003, (12 pages).

H. Hartenstein et al., see "Position-aware ad hoc wireless networks for inter-vehicle communications: The fleetnet project," *Proc. ACM Symposium on Mobile ad hoc networking and computing*, pp. 259-262, 2001.

R. Morris et al., "Carnet: A Scalable Ad Hoc Wireless Network System," *Proc. 9th workshop on ACM SIGOPS European Workshop*, 5 pages, 2000.

L. Wischhof et al., "Adaptive broadcast for travel and traffic information distribution based on intervehicle communication," *Proc. Intelligent Vehicle Symposium*, IEEE, 2003 (6 pages).

J. Tian et al., "Spatially aware packet routing for mobile ad hoc intervehicle radio networks," *Proc. ITSC*. IEEE, 2003 (6 pages).

J. Hubaux et al., see "The security and privacy of smart vehicles," in *Security and Privacy Magazine*, vol. 2(3), pp. 49-55.

M. E. Zarki et al., "Security issues in a future vehicular network," in *European Wireless*, 2002 (5 pages).

P. Golle et al., "Detecting and correcting malicious data in VANETs," in *Proc. ACM VANET'04*, 2004, pp. 29-37.

M. T. J. Hedrick et al., "Control issues in automated highway systems," *IEEE Control Systems Magazine*, vol. 14(6), pp. 21-32, 1994.

L. Briesemeister et al., "Disseminating messages among highly mobile hosts based on inter-vehicle communications," *Proc. IEEE Intelligent Vehicles Symposium*, Oct. 2000 (6 pages).

J. Yin, et al., "Performance evaluation of safety applications over DSRC vehicular ad hoc networks," *Proc. ACM VANET'04*, Oct. 2004 (9 pages).

J. Wahle, "Information in intelligent transportation systems," in *Ph.D. Thesis*, Jan. 2002 (145 pages).

L. B. Michael, "Adaptive layered data structure for inter-vehicle communication in ad hoc communication networks," *Proc. 8th World Congress on Intelligent Transportation*, 2001.

Curescu C et al., "Price/utility-based optimized resource allocation in wireless ad hoc networks," IEEE Secon 2005, 2005 Second Annual IEEE Communications Society Conference, Santa Clara, CA, USA, Sep. 26-29, 2005, pp. 85-95.

\* cited by examiner

MICROUTILITY 3: D_max=4, U_origin=195, U_distance=-25

SELECTION OF INFORMATION FOR TRANSMISSION AND STORAGE IN AN AD-HOC NETWORK BASED UPON LOCAL SYNOPSIS EXCHANGE

BACKGROUND

Vehicle Ad-Hoc Networks (VANETS) and similar networks for pedestrians and bicyclists are very different from traditional ad hoc networks. In VANETS, most network nodes are mobile, with a significant fraction of links breaking every second. Most nodes are both data sources (transmitters) and data sinks (receivers) and output data almost continuously. The nodes have information needs that are continuously changing based upon their position. They may be spaced far apart, as when they leave the dense urban cores, and sometimes operate in "urban canyons" with very poor wireless connectivity. Network congestion, link instability and vehicle density vary widely and may change rapidly, as when a traffic light changes, releasing a queue of waiting vehicles. Network congestion, scalability issues, link instability and the complexity of application-building pose problems for these networks that would be nearly insurmountable using current techniques.

Two early large projects on large wireless ad hoc networks are CarNet and Fleetnet, discussed by R. Meier and V. Cahill, see "Exploiting proximity in event-based middleware for collaborative mobile applications," in *Proc. Distributed Applications and Interoperable Systems: 4th IFIP WG6.1 International Conference*, pages 285-296, 2003; and by H. Hartenstein et al., see "Position-aware ad hoc wireless networks for inter-vehicle communications: The fleetnet project," in *Proc. ACM Symposium on Mobile ad hoc networking and computing*, pages 259-262, 2001.

Routing protocols for VANETs have been disclosed, for example, by R. Morris et al., see "Carnet: a scalable ad hoc wireless network system," in *Proc. 9th workshop on ACM SIGOPS European Workshop*, pages 61-65, 2000; Hartenstein et al. (previously cited); L. Wischhof et al., see "Adaptive broadcast for travel and traffic information distribution based on intervehicle communication," in *Proc. Intelligent Vehicle Symposium*, IEEE, 2003; and by J. Tian et al., see "Spatially aware packet routing for mobile ad hoc intervehicle radio networks," in *Proc. ITSC. IEEE*, 2003.

Security issues in VANETs have been disclosed, for example, by J. Hubaux et al., see "The security and privacy of smart vehicles," in *Security and Privacy Magazine*, volume 2(3); M. E. Zarki et al., see "Security issues in a future vehicular network," in *European Wireless*, 2002; P. Golle et al., see "Detecting and correcting malicious data in VANETs," in *Proc. ACM VANET'04*, 2004; and control issues are discussed by M. T. J. Hedrick et al., see "Control issues in automated highway systems," in *IEEE Control Systems Magazine*, volume 14(6), pages 21-32, 1994.

VANET safety applications have been disclosed, for example, L. Briesemeister et al., see "Disseminating messages among highly mobile hosts based on inter-vehicle communications," in *Proc. IEEE Intelligent Vehicles Symposium*, October 2000; J. Yin, et al., see "Performance evaluation of safety applications over DSRC vehicular ad hoc networks," in *Proc. ACM VANET'04*, October 2004; Route planning and transportation are discussed by J. Wahle, see "Information in intelligent transportation systems," in *Ph.D. Theisis*, January 2002.

The issue of proximity based data dissemination has been discussed (by R. Meier and V. Cahill, see "Exploiting proximity in event-based middleware for collaborative mobile applications," in *Proc. Distributed Applications and Interoperable Systems: 4th IFIP WG6.1 International Conference*, pages 285-296, 2003), teaching an architecture that allows proximity based subscription to information based on proximity where different applications can subscribe to information within different distances. However, the possibility of a fractional amount of information reaching a destination is not disclosed.

The idea of layered data dissemination is discussed by L. B. Michael (see "Adaptive layered data structure for inter-vehicle communication in ad hoc communication networks," in *Proc. 8th World Congress on Intelligent Transportation*, 2001) that was motivated by a proximity-based need for information in different applications. Using Michael's data structure, packets are transmitted with layers of data which are successively removed from the data structure as the information travels further from the source. A disadvantage to this approach is that it prohibits the possibility of fractional information of any form different from that present in the layered data structure. Moreover, neither Meier and Cahill nor Michael quantifies the need for variable resolution information based on proximity to the source of the information.

DETAILED DESCRIPTION

Figure 1:
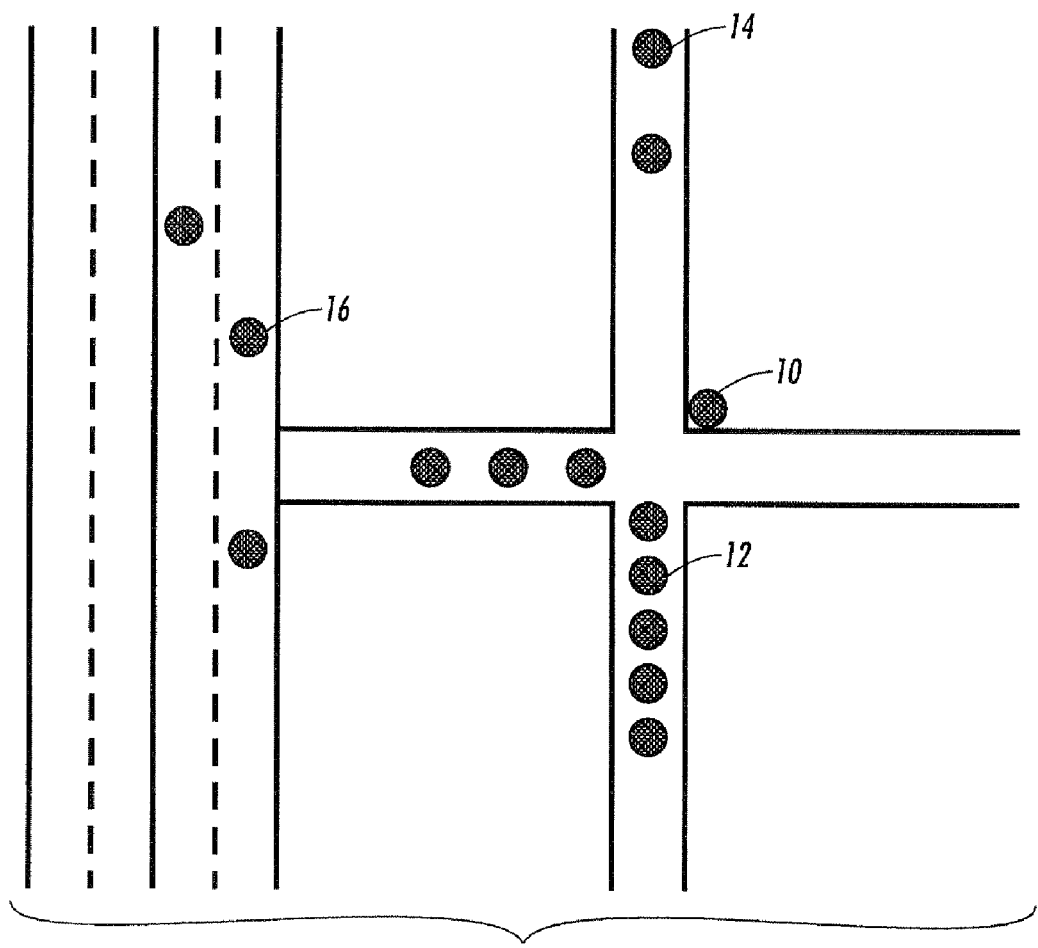
FIG. 1 shows an embodiment of a vehicle ad-hoc network.

An example of a VANET is shown in FIG. 1. Node 10 is a fixed node that communicates with other nodes as they come into range. Nodes 12, 14 and 16 are mobile nodes in various situations. As can be seen, node 12 is in a very dense environment, in close proximity with several other nodes. Node 14 is in a very sparse environment, and node 16 is on a fast-moving road. Each of these nodes is broadcasting its information frequently. Several problems may arise in an ad hoc network having nodes that may traverse all of these environments in a short time. Disseminating the information from the nodes, updating information at other nodes, and determining at what points the information should no longer be disseminated for various applications would be nearly impossible with current techniques.

Figure 2:
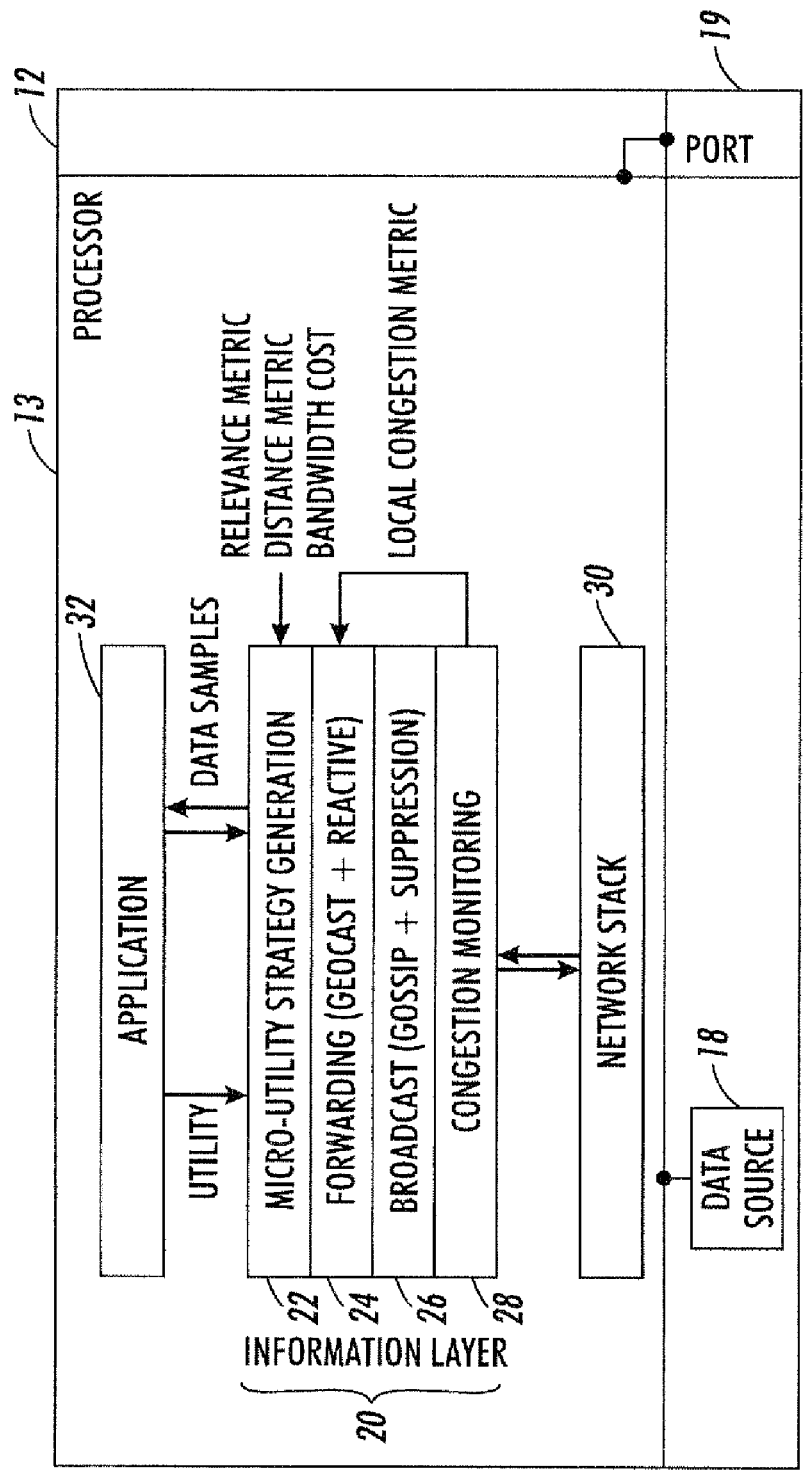
FIG. 2 shows an embodiment of a node in a vehicle ad-hoc network.

FIG. 2 shows an embodiment of a node, such as node 12. Node 12 may include a processor 13 employing a 'protocol stack.' Network protocols are usually organized as stacks with higher layers passing information for transmission to lower layers and lower layers passing received information to the higher layers. The term 'layer' refers generally to a logical separation of functions. Each layer may be implemented as hardware, software or a mix of the two. In one embodiment of the node 12, the processor 13 is employing a network stack that includes a new layer, the information layer 20, interfacing with an application layer 32 and the networking layer or layers 30.

One skilled in the art will understand that not all of the displayed features of the node 12 need to be present for all embodiments. Such a skilled person will understand that the node 12 may be a data source node with a data source 18, and that the processor 13 need not be a general purpose processor. The device may be referred to as a computer, in that it has a processor 13. Further, nodes within the scope of the claims may include data source nodes, recipient nodes, and relay nodes. The node may also include a port 19 for reception and transmission of information.

Further, one skilled in the art will understand that a procedure or process may be a self-consistent sequence of computerized processes that lead to a desired result. These processes can be defined by one or more computer instructions. These processes may be stored all or in part on an article of computer readable media containing the instructions. The instructions when executed cause the computer, here the device 10, to perform the processes set out herein.

FIG. 2 shows the protocol stack with the information layer 20 divided into further sublayers. Network protocols are usually organized as stacks with higher layers passing information for transmission to lower layers and lower layers passing up received information to the higher layers. FIG. 2 follows this pattern in the information layer, dividing it into the sublayers that will be described in detail in the next few sections. The information layer provided here is built on top of a standard network protocol stack and shown as a single box 30 at the bottom of FIG. 2, although, in practice, it consists of multiple sublayers. Experiments conducted by the inventors have used a standard UDP/IP protocol stack with an 802.11b interface which is closely related to DSRC (802.11p). Almost any network protocol would be suitable at this level, including other contention-based and scheduled protocols. In this example, application layer 32 sits on top of the information layer.

Information dissemination is very closely related to database synchronization. It was found that the techniques of "epidemic algorithms" were useful in two places in the design. First, a "gossip" mechanism is used to suppress unnecessary broadcasts at a low level of the system. Flooding algorithms use broadcast and rebroadcast to push updates effectively across large areas. This can lead to congestion, as data is repeated unnecessarily many times. Gossip algorithms prevent this by listening to other nodes' transmissions and dropping data which they have overheard being successfully forwarded by other nodes. The term "gossip" comes from the social sciences where it was observed that individuals stopped spreading rumors once they had heard them several times.

The system uses a form of "anti-entropy" to synchronize information between moving vehicles as they encounter other vehicles which have not received the same set of data. The version of anti-entropy used here is utility-aware, so it synchronizes only the most valuable updates. Entropy is the increasing disorder in a physical system. The term here is used to describe distributed algorithms that remove the disorder between the database copies by exchanging updates.

This system adds several innovations on top of Geocast. Geocast limits flooding to cover a prescribed geographic area. The system uses geocasts incorporating gossip algorithms, and so the forwarding is as rapid as geocast and prevents redundant transmissions as effectively as gossip-based methods. The microutility approach uses multiple geocasts, adjusting the geometric scope of each to deliver different quantities of data to different spatial regions, maximizing the quantity or frequency of data delivery to the most relevant destinations. Moreover, the geocasts include dynamic priority information, so that when congestion arises in the network, data can be dropped or queued in a utility-aware fashion.

In the information layer, the planning of a multiplicity of geocasts and the setting of their dynamic priorities is accomplished by a strategy computation that combines utility functions supplied by the applications with statistical information about vehicle flow patterns. This makes applications far simpler to write, since they no longer must design their own geocast patterns, monitor vehicle flows and adapt their geocasts. Furthermore, it eliminates the complexity of applications having to detect the presence of competing applications, compare their relative priorities and adapt their own behavior.

For example, the addition of a new high-priority application might necessitate redesigning the geocast patterns of all other applications to free sufficient guaranteed bandwidth. By contrast, the strategy sublayer 22 can adapt easily and automatically to these kinds of changes, readjusting the geocasts to maximize the overall utility under the current traffic constraints of the network. The system can achieve much higher utility from this strategy computation, and yet still benefit from the simplicity and efficiency of geocast.

The top of FIG. 2 shows a single application 32 using the information layer 20, although one of the strengths of this architecture is the ability of multiple applications to use a common interface. An application gives the strategy sublayer 22 a very high-level specification of its information dissemination needs in the form of a utility function. The strategy sublayer 22 also has relevance and distance metrics, either previously provided by traffic engineers or gathered automatically from the network, describing statistical vehicle flow in each neighborhood and the predicted utility of data to hypothetical vehicles in those regions.

The information layer resides on nodes operating as data sources, on nodes operating as relay nodes and on nodes operating as recipients in the system. A node in the system may play one or more roles with respect to a given data type: for example it may be a source of a data type, and it might also operate as a relay node, propagating the same data type received from its neighbors, or it may be a data sink and process received data in an application. The information layer 20 has a slightly different function depending upon its role.

For example, in the data source role, the information layer will receive the utility function from the application needing to propagate information.

The information layer 20 applies the utility function to produce a microutility. The microutility travels with a data sample and provides guidance to the system as to how the information is to be sent and handled through the system, such as how far and to which geographic area the information should propagate. By contrast, in the relay role, the information layer does not require that the application be running locally, and makes propagation decisions purely based on the contents of the packet and contextual information about the node and its neighborhood.

The information layer 20 applies the utility function to produce a microutility. The microutility travels with a data sample and provides guidance to the system as to how the information is to be sent and handled through the system, such as how far and to which geographic areas. The microutility acts as a dynamic priority, which is to say, a priority which is evaluated as the data sample moves through the network rather than fixed at the time the data sample is created. This allows decisions to be made based on dynamically-changing information which is not available to the data source node, such as the level of congestion at the location of a relay node. For example, two different nodes at two different locations from the data source may evaluate the microutility of a sample differently, one node deciding to transmit the data sample and its microutility in the system, the other node deciding to drop the sample.

Using these mechanisms, the strategy generation sublayer 22, also referred to as the microutility generation module, can send information where it is most relevant. It could, for instance, send information a longer distance down roads with fast-moving vehicles, because those vehicles may need more time to respond to data than slower moving vehicles. To prepare for information dissemination, the strategy sublayer 22 develops a plan based on utility, relevance, and distance metrics, as well as contextual information, such as its current estimate of the level of congestion in various regions of the network. When the application sends an individual data sample, the strategy sublayer 22 assigns a microutility to the sample based on a plan devised automatically from the utility, relevance, and distance metrics. The relevance and distance metrics may be previously-provided in the system at configuration or start up, or these metrics may be gathered by the system. The microutility specifies, among other things, a geometric region to which the data should be delivered; the microutility and the data are provided to the forwarding sublayer 24.

As mentioned above, the information layer 20, including its sublayers or modules, resides on nodes operating as data sources, relay nodes and recipient nodes. Each of these nodes may be able to play any one of these roles, depending upon the situation. For example, a relay node may be also a source node and a recipient. When operating as a relay node, a node may receive a data sample with an associated microutility, which includes information as to how the data sample is to be handled in transit. The relay nodes evaluate the microutility to determine how the data sample is to be propagated through the network.

The effect of the microutility depends upon the characteristics of the node. For example, a node close to the data source may evaluate the microutility and determine that it needs to forward the data sample because the data appears to have significant remaining utility and the node is within the geometric delivery region. A node outside the intended area may choose not to forward the data sample, as the usefulness of the data sample in the area in which the node resides is zero. The node evaluates the microutility based upon the node's characteristics to decide whether to further propagate the data, and how best to do so. The microutility may be thought of as a priority, but because the effect of it changes based upon data available only to the node evaluating it and the time and place of its evaluation, it is a dynamic priority.

The purpose of the forwarding sublayer 24 is to send data over multiple hops in the network, if necessary, to reach the entire geometric region specified in the microutility. This sublayer plays a role in both the initial transmission of data and in the retransmission of data received from neighboring nodes, as show by the data flows of FIG. 4. The forwarding sublayer 24 also reacts quickly to local network congestion and reduces traffic load by dropping or propagating packets selectively based on the dynamic priorities of data samples in the system.

Once a decision is made to forward a packet, the broadcast sublayer 26 handles the transmission. This layer listens for multiple broadcasts of the same data by other nodes, and is thereby able to reduce the number of duplicate transmissions of the same data in the same area, a frequent problem with flooding algorithms.

The broadcast sublayer 26 is responsible for broadcasting a data sample and its associated microutility to the neighboring nodes. In a carrier sense multiple access network (CSMA) this involves waiting for the channel to be free and then sending the data sample. However, when information is forwarded from node-to-node, that is, when receivers of data samples are retransmitting the data samples, extra care must be taken to avoid introducing too much traffic into the network. The broadcast sublayer 26 may address two potential problems.

The first problem may occur if a node receives an update more than once. It should not propagate the update a second time. This may be avoided with a table or other set maintenance technique that records recently received updates, and does not deliver duplicates to the forwarding sublayer 24. This duplicate suppression prevents circulating updates unnecessarily in the network.

Figure 3:
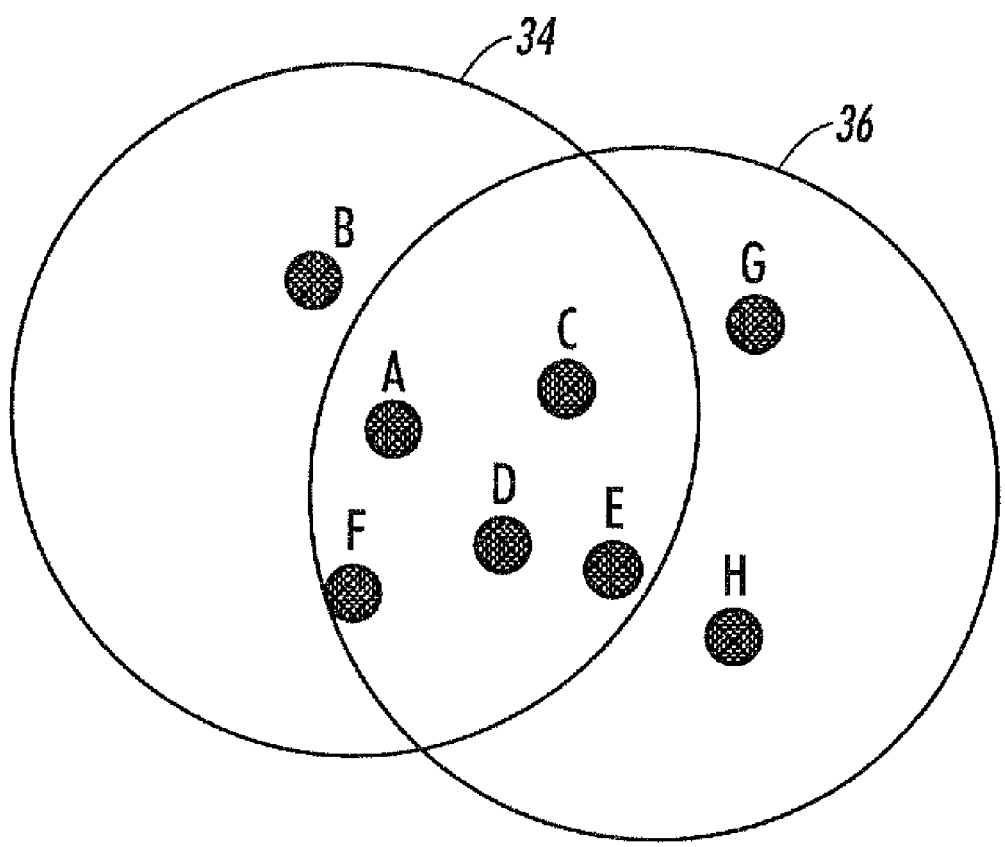
FIG. 3 shows an example of an overlap region between two broadcast regions.

The second problem occurs in dense regions, if every recipient attempts to forward an update once or more, then the update will get retransmitted many more times than necessary. FIG. 3 shows a potential problem. The intersection of circles 34 and 36 shows an overlap region between broadcast regions for nodes A and E. If every node in this Figure broadcasts an update then there will be 8 transmissions of the update. However, if node A broadcasts the update and then node E retransmits the update, then every node will receive the update with much less network traffic. Unfortunately the solution is not usually as simple as just described.

In the information layer, gossip-based suppression is used to thin the rebroadcasting of updates in areas of high density. Gossip-based suppression works by temporarily delaying the broadcast of an update by a random amount in an interval $[0,\tau]$. While forwarding is temporarily delayed, neighboring transmissions may be received, and the number of broadcasts of the same update during the delay are counted. If more than g transmissions are overheard, then the transmission is suppressed, as the message has been received with high confidence by all relevant nodes.

For example, in FIG. 3, if g=3, A broadcasts the update, and then both C and D rebroadcast the update, then the nodes B, E, F will not retransmit the data because they have already received g=3 copies of the data. G and H will continue to attempt to forward the update since they have only received 2 copies, but one of them will suppress the other. In this case, gossip suppression does not find the minimal solution to rebroadcasting the update, which was 2. Nevertheless gossip suppression is a simple technique that greatly reduces the amount of data retransmission in dense networks.

One skilled in the art will recognize that many variations on mechanisms that suppress data retransmissions on data received exist and may be used in place of any specific mechanisms set forth here. No limitation to any particular suppression mechanism is intended nor should be implied here.

Finally the congestion sublayer makes no modifications to the content of the data packets, but adds a congestion report to the headers of packets before they are transmitted, collects these reports from received packets, and produces a congestion summary to inform the forwarding and strategy sublayers of the local network congestion. The information layer may then decide to drop data samples or select alternative media for transmission of the data samples.

Congestion reports may also be included in explicit management packets, rather than included in data packets. The congestion summary may be for an area rather than specific nodes and may be of an extended view, such as system wide, rather than local. The information layer may then decide to drop data samples or select alternative media for transmission of the data samples.

Figure 4:
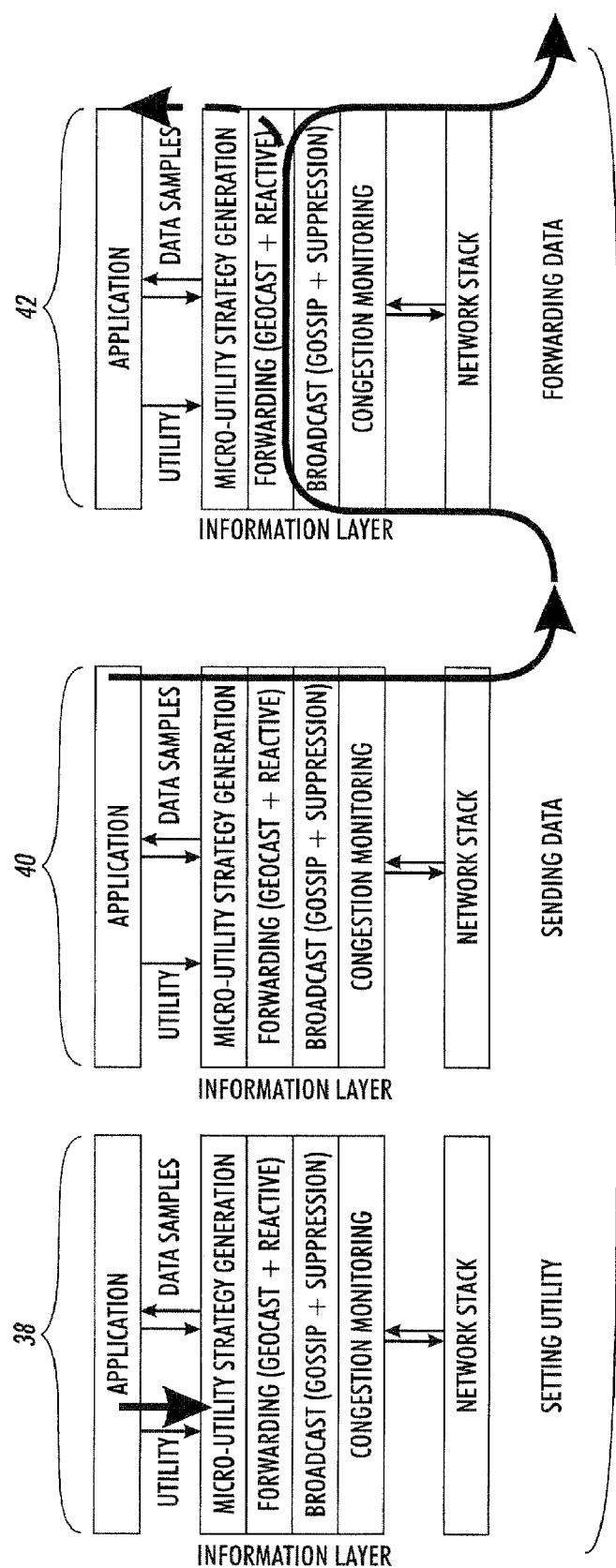
FIG. 4 shows an embodiment of an information layer setting utility, sending data and forwarding data.

FIG. 4 illustrates the operation of the system. At 38, an application initially supplies a utility function and the strategy sublayer does the computations necessary to generate individual microutilities. These computations may be performed in advance, periodically, or at the time of the data generation. At 40, when the application generates an individual data sample the strategy sublayer assigns a microutility and, if appropriate, begins transmitting the data sample. At 42, nodes forward the data sample according to the microutility. The dashed arrow shows the possibility of a node's application receiving the data.

While 38 is very efficient—it should be possible for an application to change utility functions in a few seconds—40 and 42 are extraordinarily efficient. The most frequently performed operation of the system 42, forwarding of data, in most cases requires only simple geometric tests and the evaluation of linear functions. It is believed that these operations are simple enough to be performed, at packet rates, by even a relatively small microcontroller.

The system is designed so that utility functions supplied in 38, while not directly part of the frequently executed processes 40 and 42, are distilled into simple microutilities that influence the information propagation of the system. These microutilities also guide two other important operations of the protocol not shown in FIG. 4. Some of the data of high utility is sent by longer range channels, and data with utility persisting over a longer time period is stored temporarily in transit, for later forwarding after vehicles have moved and communication possibilities have changed. Altogether microutility is used extensively to maximize the utilization of the network.

Utility

A utility function describes how valuable data delivery is to recipients. It can assign value to such things as: how much data is delivered and the timeliness of delivery. The utility functions are what economics would call "cardinal utility" functions: their magnitude is important: data with utility 10 is twice as valuable as data with utility 5. It is intuitively useful to think of utility as the amount that a recipient would pay for the data delivery (e.g. $10). However, in a typical market the monetary amounts necessary to purchase goods do not necessarily agree with the utility of those goods. The system treats utility as a unitless quantitative measure of satisfaction, although a monetary interpretation would still be appropriate for what follows. In any case, utility serves as a medium of exchange with which the applications may compete for limited bandwidth in different parts of the network.

The system assumes that there are sources generating periodic streams of sampled data and that an essential operation of the system is dropping samples from these streams. It is further assumed that a downsampled stream of data will have less information content and that utility for information will usually diminish with distance from the source. It is this diminishing utility that will allow the system to drop data as it propagates further from the source, thereby reducing data traffic.

The information disseminated in the system has a utility function applied to it. The utility function determines the propagation of the information. Generally, the utility function will be based upon an application for which the information is intended when transmitted from a data source. The utility function may be altered to reflect local conditions. The utility function supplied by the application may therefore be referred to as the generic utility function. Generic utility functions, after being altered by local conditions, may be referred to as specific utility functions. This discussion will use the unqualified term utility function to refer to either the generic utility function or the specific utility function.

The system is architected around the general concept of each application providing a utility function for information (denoted generally by I):

$U(I, \vec{x}_t, \vec{x}_s)$, where the recipient is located at geographic location $\vec{x}_t$ and the data source is located at $\vec{x}_s$. In our scenarios, this is often reduced to the case $U(I, \vec{x})$ where $\vec{x} = \vec{x}_t - \vec{x}_s$.

Rather than using an abstract information content I, the system will work with a more concrete special case, where the system assume that the source is generating regular data samples and that information content is reduced by dropping a subset of the data samples either immediately at the source or in-transit when congestion arises. This is typical of many applications. For example, if the source is sending position and velocity of vehicles, then discarding data samples will reduce the accuracy of predicted vehicle locations. It is possible to simplify the parameterization of U by replacing the abstract representation of information, I, with the average frequency of data received, f, and the typical delay τ of data samples received. These two parameters are connected with information: less frequent updates received from a source, or more delayed updates from a source, will mean that the system has less information about the current state of the source:

$$U(f, \tau, \vec{x}).$$

However, rather than geographic displacement $\vec{x}$, the utility function may be based on a distance metric d that is based on the typical time for the vehicle receiving the information to arrive at the information source. The metric $d(\vec{x}_t, \vec{x}_s)$ will capture the salient features of road geometry and flow rates. For example, d will capture the direction of travel of the receiving vehicle; if the vehicle is already traveling towards the source, then the distance to the source will be less:

$$U(f, \tau, d).$$

A key operation of the system will be adjusting f over space to maximize utility while minimizing cost of propagation.

More specifically, having f decrease with distance from the data sources will reduce network traffic. In certain applications, data available at the source (e.g. the number of spaces available in a parking garage or the color of a traffic light), will affect the region, distance, time or characteristics of the vehicles for which the data has high utility. For example, frequent updates about a filling parking lot which is nearly-full is of high value to nearby cars, since they would want to know of a closure, but of little use to far-away cars, since the lot is almost certain to be full by the time they arrive. Since the microutilities are preplanned at the source, they can easily be adjusted according to the source conditions.

One skilled in the art will recognize that U may depend upon other characteristics of the data delivery. No limitation to any particular characteristics is intended nor should be implied by any examples given here.

As described above, generic utility functions are determined by the application writer when an application is created or installed on the data source nodes. Some factors that may affect utility include whether the vehicle will receive information within a certain time, the rate at which uncertainty of the measured quantity grows, whether the vehicle will make a decision based on the received information, the accuracy of the received information, and how much was "at stake" when decisions are made based on the data.

While all of these factors play a role in the utility, some are easier to model than others. The information layer can provide criteria to an application to help it make a decision. It could, for instance, provide criteria based on how many cars are likely to be present at a particular location, how many cars are driving in particularly relevant direction, or are likely to pass by some other location, such as a parking lot, or pass through a region with available traffic information. For this reason, the system will factor utility into two parts:

$$U(f,\tau,d)r(\vec{x}_t, \vec{x}_s)$$

where U is the expected utility per-vehicle receiving the information, and, $r(\vec{x}_t, \vec{x}_s)$, which the system will call "relevance," is a prediction of the importance of a data sample to vehicles near $\vec{x}_t$ that will find the information from the source $\vec{x}_s$ useful. The system expects the application writer to supply U and in some cases $r(\vec{x}_t, \vec{x}_s)$. However, the information layer can also provide a standard $r(\vec{x}_t, \vec{x}_s)$ based on gathering data on where vehicles travel. This could be, for example, a selective traffic model based on sampling the trajectories of vehicles currently at the location of interest and using this data to estimate the probability that they will travel near the source.

When $r(\vec{x}_t, \vec{x}_s)$ is a nonuniform distribution, the information layer can save bandwidth by directing information to where it is most useful. Systems with large numbers of participants with rapidly changing positions, such as vehicle networks, are often architected as "push" systems, in which data is transmitted to destinations without first receiving explicit requests. Metrics such as relevance allow these "push" architectures to direct information to where it is statistically most likely to be needed using the relevance function $r(\vec{x}_t, \vec{x}_s)$ and without requiring any communication with potential recipients.

Figure 5:
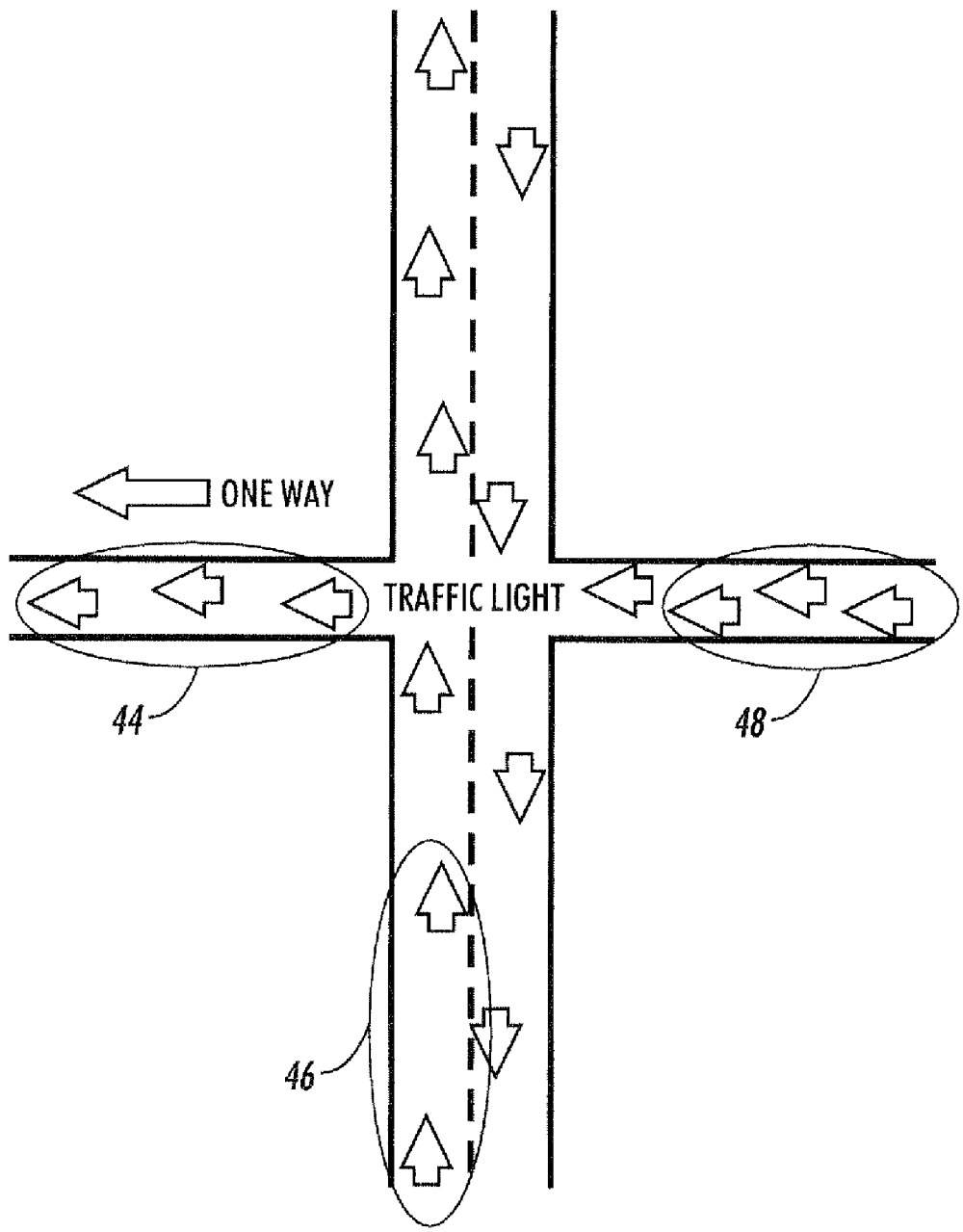
FIG. 5 show an example of node groups for which information has different relevance.

FIG. 5 shows an example of a relevance metric near a traffic light. For example, in FIG. 5, the information propagated from the traffic light has low relevance for group 44, with a long distance associated with any potential use of the data to those recipients. The potential recipients in group 44 would have to go around the block to visit the traffic light, and are heading away from the light. The information has high relevance for the recipients in group 48, as those recipients are heading towards the light and have a high probability of actually visiting the area controlled by the light. Recipients in group 46 would probably consider the data highly relevant, the distance is short, and the vehicles are moving fast. These factors are considered in the relevance metric.

The accuracy of information is a common trait to most applications and probably most easily modeled. Most decisions involve predicting the state of future events (e.g. traffic jams, parking availability, etc.), but the predictive accuracy of information will decrease with information age. This often sets up a natural decay in the value of information with distance. and time. Knowing, for example, that a parking garage is full will be less valuable to vehicles further away from the garage because, in the time it takes to drive to the garage, the information may become obsolete. This decay in value with distance and time will prove critical to reducing the network traffic.

The potential loss or benefit of a type of information is much more application specific. Understanding loss or benefit will help prioritize applications with respect to each other, and packets relative to one another within a single application. For example, information that supports a safety application may have much higher utility than parking information, while vehicle information describing a lane blockage is more important than vehicle information describing a smooth flow. The loss or benefit often provides an application-specific variation in utility with distance. For example, parking garage information will be most useful at moderate distances, where this information is still likely to be applicable at a near-future time when a vehicle arrives at the garage, but where alternate routes can still be taken to other garages if the garage in question appears likely to fill up.

As mentioned above, the application writer will supply the generic utility function governing the propagation of information for the application. This is different from a typical economic model where individual recipients and individual data sources have their own unique utility for data delivery and a market mechanism is used to optimize resources across these utilities. Instead, the push architecture, which inherently delivers benefits of many recipients at the same time, is better served if the application writer supplies a generic utility function that estimates the benefits of all the likely recipients of the information propagation. When more than one application has use for the same data, then both applications can supply generic utility functions and these can be combined to determine a generic utility function for the data type.

This makes deriving generic utility functions, especially accounting for the factors affecting utility described above, a challenging task. Fortunately, utilities will be derived infrequently, and by a small number of application writers. Moreover, these utilities should not be over-designed for accuracy. The choice of the form of utility in the two-part equation limits the dependencies of the utility to parameters such as frequency of delivery, delay, traffic flow speed, etc., and these dependencies will not cover all the factors affecting utility for applications. Perfect modeling of utility is not possible. Only those parameters that might significantly affect utility are chosen, and some loss in accuracy will be accepted. Likewise, application writers should choose only the most salient features of utility to model their application.

Utility Specification

To specify utility, the application writer may identify a set of possible information delivery patterns for the data samples at a data source. As this system is generally a push architecture, the application must project and predict the possible delivery patterns that may occur at locations in the system and specify utility for each of the set of possible delivery patterns. Further, there may or may not be recipients at those locations. The probability of there being a recipient at a specified location becomes a factor to be accounted for in the possible delivery patterns, as does a probability that a receiving node located at the specified location will be interested in the information and observed characteristics of the delivery patterns observed by a receiving node located at a specified location.

The generic utility function predicts the usefulness of the information to the recipients and is used at the source, rather than at the recipient. As described above, several factors affect utility, including frequency of updates, the delay of those updates in reaching the recipient, the direction-of-travel of the recipient and the distance of the recipient from the source. These can be more generally referred to as time and position factors.

Time factors would include frequency, or how far apart in time the samples are sent, and delay, or how far apart in time from transmission, the samples are received. Position factors would include the distance between the source and the recipient, both with regard to the physical distance, and how the distance affects the time of reception. Position factors would also include the direction of movement between the source and the recipient. The time and position factors may combine together, such as discussed above with regard to adjusting the frequency over space to maximize utility.

The generic utility function may then be used to guide the propagation of the data sample in the network. Guiding the data sample may include such tasks as making choices between alternative media for transmission, deciding at what point in the network the samples should be dropped, re-ordering transmission queues in which the data samples are waiting for transmission, and deciding whether or not to hold a data sample for further transmission. Re-ordering a transmission queue may be referred to as modifying a temporal order of transmission of the data sample or samples.

In one example of a generic utility function, a parking lot application is assumed in which parking lots send information about their current occupancy as well as information such as arrival and departure rates that will allow recipients to predict future occupancy. This information can be used by vehicles in the vicinity to plan their parking destination.

Figure 6:
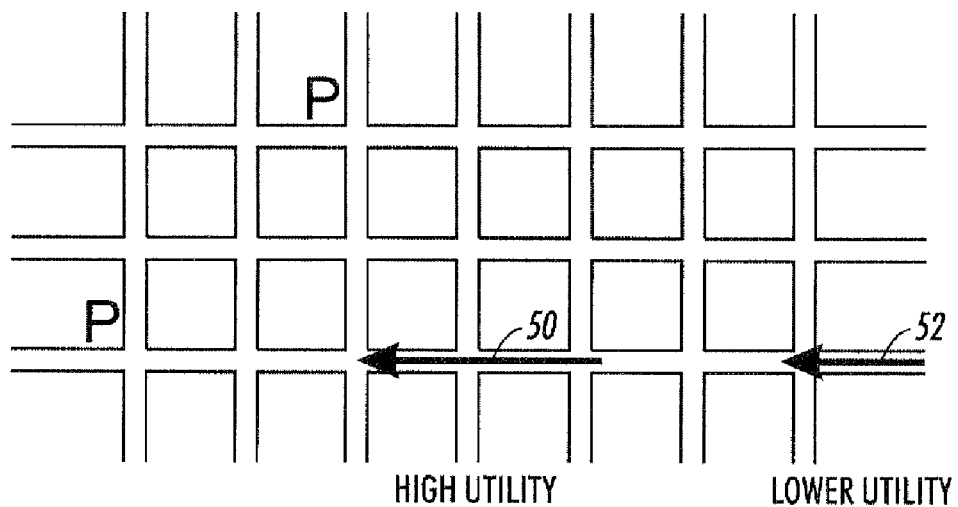
FIG. 6 illustrates different nodes for which parking information has a different utility.

FIG. 6 illustrates the utility of parking lot information. The utility has the highest value at medium distances such as at 50, where the information is reasonably predictive of future occupancy and a driver can easily divert to alternative garages. At larger distances such as at 52, the information loses utility because it is less predictive of future occupancy and choosing a specific garage is unnecessary. At closer range, rapid updates are helpful, since the driver can take advantage of even a single space opening up. Overall, the driver has less to gain up close as the driver has already driven into close proximity of the garage, although it may have some value in areas with many garages which the driver must choose between.

Figure 7:
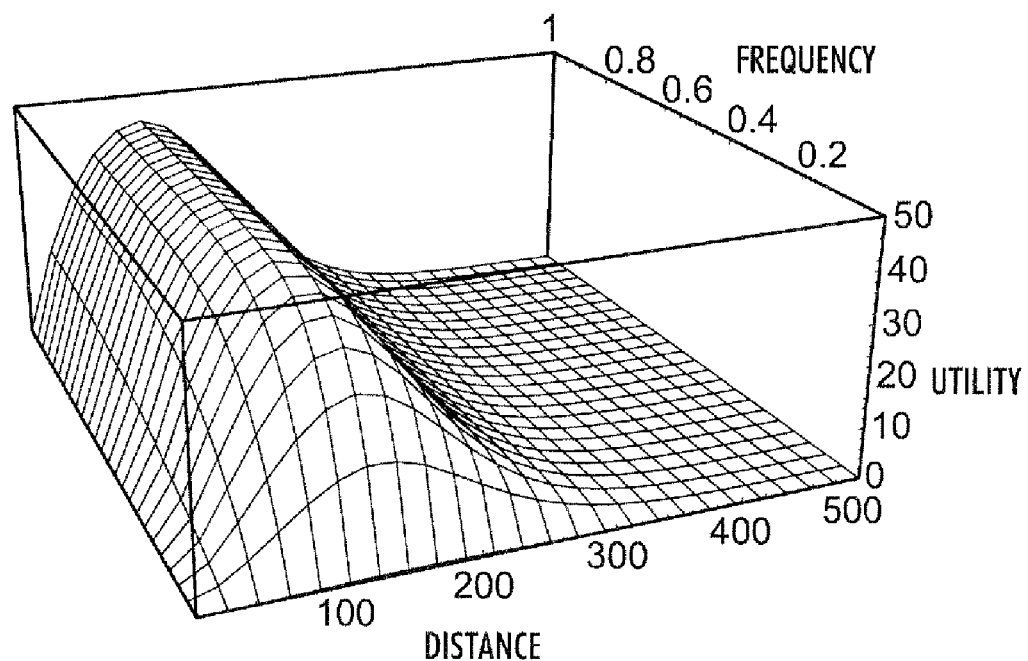
FIG. 7 shows a graph of an embodiment of utility for parking information.

FIG. 7 shows a sample utility function for parking lot information. The utility function shows the highest utility at moderate distances from the garage. The utility function also shows the steepest slope at low values of f, and shows diminishing value for larger values of f. This diminishing value is expected. Very frequent reports from the garage will not significantly improve the prediction of future occupancy.

In this example, the parking lot utility function depends on the state of the garage through the parameters of K, current free space, $\lambda_{in}$, rate of arrivals, and $\lambda_{out}$, rate of departures. In particular, when the garage is about to become full, the shape of FIG. 7 will shift towards the origin, indicating that the information about the garage will be most useful to those vehicles near the garage that still might arrive before the garage fills. Vehicles further away will know with more certainty that the garage will fill and will not require frequent updates. This illustrates a feature of the utility function; it can depend upon the data at the source. Because of this feature, the system described later can expand and contract the distance over which the data is sent based on the state of the garage.

With regard to the variables, the utility function of FIG. 7 is derived as follows. $T_\alpha$ is the expected time of arrival at the garage, f the frequency of delivery is the product of a base rate $f_0$ and a randomized downsampling factor $\gamma$. Randomized downsampling as used here means that on the average $\gamma$ percent of the original samples are received, the others being proactively or reactively dropped in transit. In this definition, $f_0$ is the regular frequency while f is an average frequency. Utility is defined as the product of three parts.

The first part is the probability of receiving an update, and is defined as:

$P_r = 1-(1-\gamma)^{f_0 T_\alpha}$ since $(1-\gamma)^{f_0 T_\alpha}$ is the probability that no message is received by $T_\alpha$.

The second part is the probability that received message is correct by the time of arrival. For the purpose of this example, ground truth is modeled by a Skellam distribution, which is roughly Gaussian.

$$P_c = \int_{x>0} p_{GT}(x) dx = 1 - Q\left(\frac{K + (\lambda_{out} - \lambda_{in})T_\alpha}{\sqrt{(\lambda_{out} + \lambda_{in})T_\alpha}}\right)$$

The third part is the potential benefit of the received message. This is modeled by an exponential distribution that corresponds to a Poisson distribution of alternative garages:

$de^{-\beta d}$.

The resulting utility function is shown in FIG. 7.

Notice that this utility function contains considerable information about utility. The most obvious feature is that a high degree of utility can be archived by delivering 0.2 updates per second at a distance of 120 meters (this is the "knee" of the function). But the function contains additional information: at 200 meters the there is also some utility for information delivery, although considerably less utility. And at 120 meters there is very little utility to be gained by increasing the utility beyond 0.2 updates-per-second, the function becomes nearly flat. This additional information can exploited to guide information propagation, for example, if additional bandwidth becomes available, this utility function indicates that it would be better to send updates further distances than to send more frequent updates to 120 meters.

The system does not necessarily expect application writers to derive their own utility functions. It is possible to provide utility templates. The idea is that the application writer would pick the template with the most similarity to the application, and adjust a few parameters to obtain a utility function. Given that even imperfect utility functions can yield large benefits, the system expects that a relatively small number of such template utilities will be sufficient to cover most future applications.

Utility allows trading off resources between multiple applications, but this requires a good understanding of the relative importance of different applications. As time passes, resources will need to be divided among an increasing number of applications, requiring normalization of utilities across applications. The system is designed to envision that diverse applications will assign utilities using diverse scales, so that some centralized calibration of scales will be necessary. For now, centrally-managed scaling factors will be used to scale the utility for each application. This allows for easy integration of new applications by setting a single parameter; the applications would share the same propagation machinery so there would be no need to engineer how a new application's propagation machinery interacts with an old application's propagation machinery.

Some normalizing operations will remain the responsibility of the application writer. The information layer will provide data, $n(\vec{x}_s)$, on the number of nearby data sources. The application may define a scaling of utility based on $n(\vec{x}_s)$ to discount utility when there are many nearby replicas and therefore presumably many sources of similar information.

Similarly the information layer will provide relevance data, $r(\vec{x}_r, \vec{x}_s)$, that an application can use to discount the utility of information sent to more densely packed sinks.

The utility functions supplied by application designers can include the effects of delay on the utility of the data received. However, it is often easiest for the application designers to first develop utility functions assuming that there are no significant delays. And then, as a subsequent step, add the time (delay) dimension to the utility function. This may be implemented as templates from which a designer can pick, based upon the way the designer would like to include the effects of delay in the utility function.

As one example of how delay might be added to a utility function, a linear decay of utility with time may be specified. The utility designer need only provide one parameter: the rate of loss of utility with time L. Then a utility function $U(f,\tau,d)$ can be derived from a utility that assumes no delay ($\tau$=0) by the formula: $U(f,\tau,d)=\mathrm{Max}(0, U(f,0,d)-L\tau)$. As another example, an exponential decay of utility with time can be added to a utility function by specifying a parameter quantifying the amount of time for an update to lose half of its utility value, that is, a half-life parameter H. Then utility can be derived by the formula:

$$U(f,\tau,d)=U(f,0,d)(\tfrac{1}{2})^{(\tau/H)}.$$

As another example of how delay might be added to a utility function, a transformation may be applied to a utility function that does not contain a time (delay) dimension. For example, if utility is based on the average delay of information in-hand at the recipient, a transformation can be based on the relationship between the frequency of updates received and the average delay of the information in-hand at the recipient. For example, the no-delay form for information received at a fixed frequency f implies an average delay for information in-hand between received updates of $1/(2f)$. This provides a heuristic relationship between frequency of delivery and delay, $\tau \sim 1/(2f)$, that can be used to transform a utility without delay into a utility with delay: $U(f, \tau,d)=U(1/(1/f+2\tau),0,d)$.

As another example of how delay might be added to a utility function, a distance transformation is described that is appropriate only for utilities that were designed based on vehicles receiving information, acting on that information, traveling to the source, and assuming that the value of the information when it is received depends upon the chance that it will be valid at the future time of arrival at the destination. In this heuristic, the delay is converted to additional travel distance before testing the validity, and requires the parameter, Va, of the velocity of vehicles approaching this area: $U(f, \tau,d)=U(f,0,d+Va\,\tau)$ In the above parking lot example, the specification of a function of frequency of delivery of information from a data source to a destination, parameterized by such things as distance, direction and time from the data source may be used to adapt utility. Some or all of these may be included in the utility function. As mentioned above, the system may provide utility templates to the application writer. The system may allow the application writer to adjust a few parameters. These specified, adjustable parameters may be tuned based upon contextual information, such as traffic flow density, demographic profile of the vehicles in the system, historic knowledge as well as others.

The utility specification may also accommodate some randomized downsampling of the data samples. Utility may be refined based upon a desired accuracy and desired operating points. These and other criteria may be converted to specifications of utility based upon the frequency of delivery.

Further, measures of the frequency of updates delivered and the delay in delivery of updates may weight more recently received updates more heavily than older received updates. Other measures to characterize delivery patterns that affect the utility specification may include a variance in delivery of updates, and accuracy with which a data source can be estimated from data received.

Context

Further, the utility function, while specified by developers, may be adapted based upon context, where the context is the environment of a specific data source, resulting in a specific utility function. The factors $n(\vec{x}_s)$, and $r(\vec{x}_r, \vec{x}_s)$ described above, are examples of context. These and other kinds of context may be derived from such things as a vehicle traffic flow model for vehicles that travel near the data source and the number of data sources at nearby locations.

As discussed with regard to FIG. 5, the relevance of the metrics may impact utility. The vehicle traffic flow model can include such things as vehicle density, which may be used to derive relevance of a given data source's sample, with the relevance being lower if the density is higher. The vehicle traffic models may also provide vehicle speeds to derive time-to-arrive metrics. This context information may be combined with the generic utility specification by scaling the utility function, or modifying the dependent variable input or parameter to the utility function, resulting in a specific utility function.

In one embodiment of modification of the utility function, a parameter that is part of the utility function may be modified. This modification may be provided for by the application writer that supplied the generic utility function. The application writer may have provided a 'hook' or other indicator that certain parameters of the utility function may be modified to reflect the current environment of the data source, as an example. An example of these parameters may include a traffic flow of data recipients in the environment by gathering the information from the other recipients or based on previously-provided information; in either case the information could be current or historical. Other examples include the number of data sources in the area and the number of data samples being propagated by the current data source.

Microutility

A microutility is associated with each individual data sample. Its purpose is to very efficiently and very compactly capture a small aspect of the utility function. The strategy sublayer of the protocol stack will assign microutilities to the data samples. The microutility represents a part of the "plan" to realize the best utility possible for the system; it specifies how far an individual data sample should be propagated and how the data sample should be handled in transit.

A microutility assigns a dynamically changing priority to each individual data sample in transit. This is referred to as a microutility because each individual data sample is given its own utility value, and these values are used to make in transit decisions. If there is congestion, low value items are dropped. If there is a superior (more reliable, faster, etc.) transmission medium available, high value items will also sent via that medium. If items are stored for future transmission, high value items will get preferred storage and retransmission.

The microutilities are a key simplifying element of the system. They can be compactly represented, so they can travel with every data sample, and they are simple to evaluate (a linear function). Any relay node, even those equipped with little memory or processing power, can evaluate the microutility. It is also unnecessary that the intermediate nodes be aware of the application. All of the required information necessary for forwarding is encapsulated in the microutility.

However, this simplicity is achieved at the cost of some accuracy. Microutilities only approximate the full utility functions described above. The inaccuracy comes primarily from assigning microutilities to individual data samples in isolation. The utility functions assign utility to various rates of delivery of multiple data samples, so the utility of receiving an individual data sample will usually depend on how recently other data samples have been received from the same source. Nevertheless, the system has defined microutilities to evaluate each data sample individually. This simplifies in-transit processing: there is no need to keep track of previous data samples and no need to evaluate more complex utility functions at intermediate nodes.

This simplification can still show good aggregate behavior. By assigning each data sample from a same source a different microutility, the aggregate behavior or propagation characteristics of all of the microutilities can be made to approximate the full utility function. This may be referred to as dithering, similar to dithering in digital imaging, where varying numbers of picture elements (pixels) in a region are given particular colors. When viewed with the human eye, the colors are integrated into a color that was not available in the color palette of the rending system. Similarly, by assigning or dithering the microutility of several samples from the same source, the aggregate result is a desired and closer approximation of a full utility function than could be achieved by a single sample. The next section, on the strategy sublayer, describes how to assign a mixture of microutilities to get near-optimal group behavior.

A single microutility contains an origin, a geometric domain, and a dynamic priority. The origin is the coordinates of the source of the data. It is used in the microutility to define the geometric domain. It is also likely to be useful to the application as the location of the data sample, so it will also be delivered to the application layer. When a data sample is received at the Strategy layer from an application, the utility of the data sample is converted to a microutility. As mentioned previously, it is possible to modify the utility of a data sample at the data source prior to microutility creation. The resulting microutility, whether based upon an unmodified or modified utility, is in turn encoded with the data sample to form an encoded data sample. The encoded data sample is the data sample with its accompanying microutility. The encoded data sample is then propagated through the network based upon its microutility.

Figure 8:
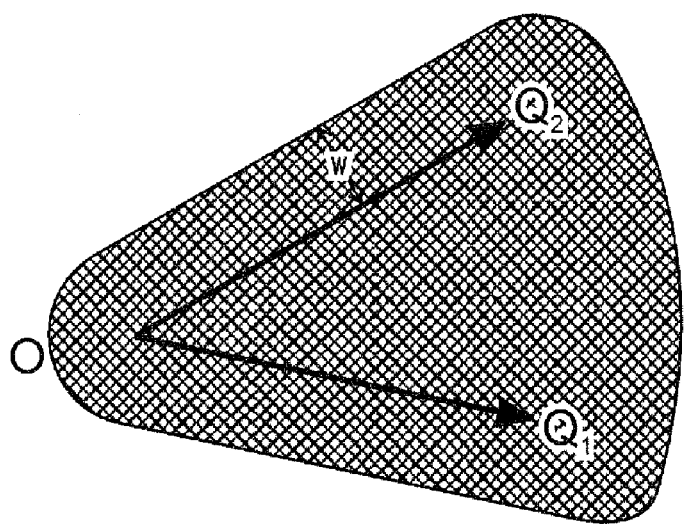
FIG. 8 shows an example of sector for data distribution.

The geometric domain is the target area for data distribution. This will be an easily-encoded and easily-tested geometric region of the plane. The exact library of geometric shapes remains to be determined; here the system uses a sector centered at the origin, with two rays $\theta 1$ and $\theta 2$. The system includes a tolerance w to allow extra flexibility in forwarding near the sector. As defined, the sector extends to infinity, the dynamic priority will limit the distance updates can travel from the origin, and thereby close the infinite sector into a wedge. A typical sector is shown in FIG. 8. In the special case $\theta 1=\theta 2$ a large w can be used so that sector covers a rectangular region enclosing the origin.

The sector can be represented compactly using rays to define the sector. The rays are defined as slopes, ray1=($\Delta x1$, $\Delta y1$) and ray2=($\Delta x2$, $\Delta y2$). Sector tests computations to determine if the sample is within its sector can be done efficiently using cross points into the slopes. Representation of the origin requires 128 bits (2×64), which are already associated with data samples. Sector representation only adds 40 bits, with 2×8 bits for each slope and 8 bits for margin. It is also possible that further compression may be possible, such as by encoding commonly used geometric shapes by a well-known identifier. The microutility at points outside the sector is zero, within the sector the microutility is determined by the dynamic priority.

Figure 9:
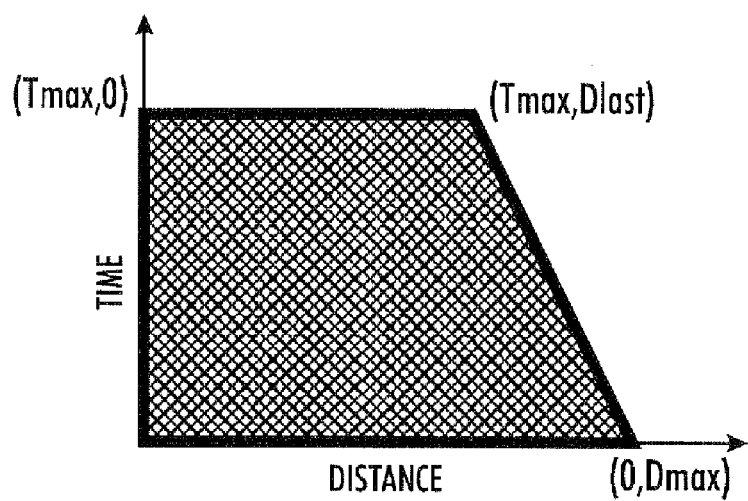
FIG. 9 shows a graphical representation of a time-space domain for dynamic priority.
Figure 10:
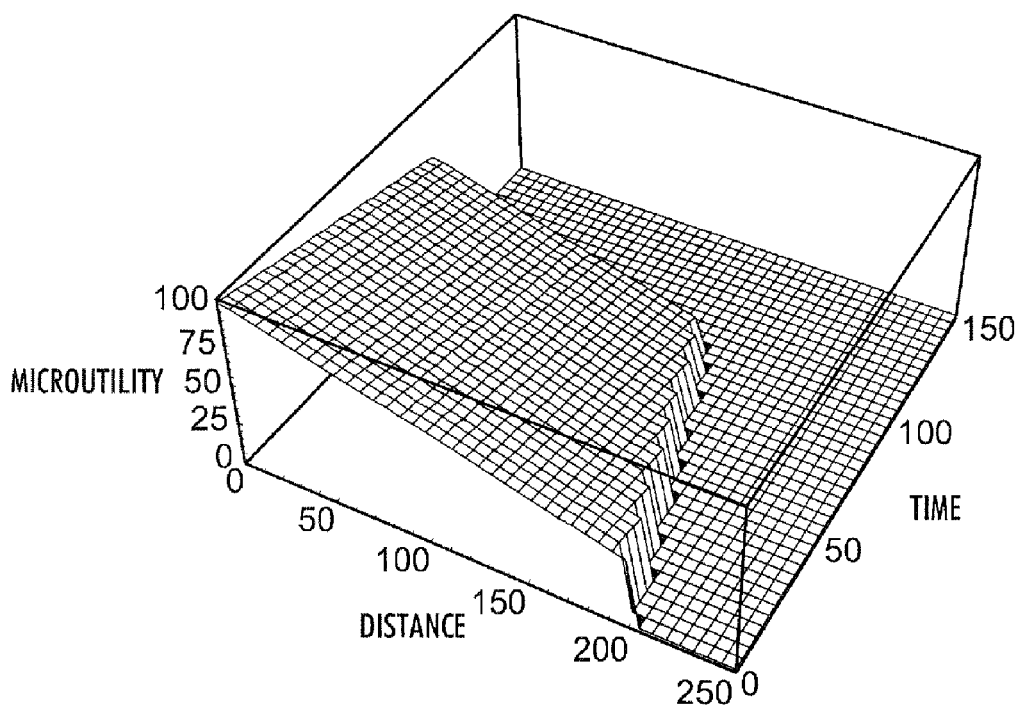
FIG. 10 shows a graph of one embodiment of a dynamic priority.

Dynamic priority is a linear function of two variables: the time elapsed since the data sample was generated, and distance the data sample has traveled since it was generated. If the (time, space) is within the time-space domain, in this example the quadrilateral shown in FIG. 9, then the priority is defined by a linear function on this domain. The linear function is determined by three intercepts: Uorigin at (0, 0), Utime at (Tmax, 0), and Udistance at (0,Dmax). Outside the quadrilateral the microutility is zero, and within the quadrilateral the linear function is clipped if necessary so that it will never be less than zero. An example graph of dynamic priority is shown in FIG. 10.

The microutilities play both a proactive and a reactive role. Under normal operation, for example, when data samples are spreading rapidly and effectively, the microutility plays a proactive role. A data sample will be geocast throughout the geometric domain defined in the microutility, with the distance from the origin limited by Dmax. However, in many cases the geometric domain, particularly Dmax, will be changed with every sample from the source, so unlike a typical geocast, the density of samples received will decay with distance. In this way the microutilities are used proactively to deliver the optimal amounts of data at different distances.

There are also reactive uses of the microutilities: for example, when unexpected congestion arises, the dynamic priority is evaluated and used to discard the least valuable data samples. Unlike the full utility functions, this is a simple linear function that is easy to compute and is only meant to approximate the marginal distribution of the full utility function. It operates like a priority, but unlike typical fixed priorities, it varies with distance and time since origination. Each data sample has a different dynamic priority, so that when congestion arises some, but not all samples are discarded.

Each data sample may have one or more microutilities associated with it. During evaluation of the microutility at the nodes, all of the microutilities may be evaluated and a microutility with a maximum value may be used. Each microutility associated with a data sample may have different geographic regions, maximum distances, time dependencies or other characteristics that differ between them.

In a system with multiple microutilities per data sample, the microutilities may be combined in a variety of ways. One method is to use a maximum function, as described above. Another method is to use a summing function, where an evaluated microutility at a location is the sum of zero or more of the provided microutilities at that location, depending upon the characteristics of each microutility specification.

Microutilities may also be compressed or abbreviated. For example, there may be several well-known microutilities that could be referenced by a name, number or other identifier, rather than a full specification in a data sample. This is discussed herein for geometric sectors, with the understanding that it could be applied to the entire microutility.

Microutilities may also employ a virtual source location and time, providing a fictitious location and time to represent some event. For example, a vehicle may sense ice on the road, and the source of the data report would be the ice, not the location of the vehicle when it transmits, which may be past the location of the ice. Alternatively, Variable Message Signage (VMS) may be placed some distance from a work site and originate safety messages about the work site using the work site location and time. In vehicle networks, some vehicles may not have communications equipment, so a 'smart' vehicle could send an event for a 'dumb' vehicle and send an update on the dumb vehicle's behalf.

Similarly, the microutility may be a function of time-of-the-day. For instance, one may release a "persistent" data sample in a ITS network and make it virtually reside in multiple regions and give it different dissemination utilities at different time of the day, or even different time of the week, of the month, of the year, etc.

Microutilities may be authenticated via a security procedure. The procedure may confirm that the microutility is genuine and may include a corresponding certification that the origin node is authorized to use the microutility in the network. One such example could be for a central authority to issue an application a certificate for the application's utility function and scaling factor. The application would present that certificate to the strategy sublayer along with the utility function and provide a microutility signing function by which each generated microutility may be signed by the certificate holder. Receiving nodes may verify that generated traffic conforms over time to the load represented by the certificate. Nodes may also use a reputation system to disallow traffic from applications violating their provisioned traffic node.

One skilled in the art will recognize that microutility may include any function that encodes spatially and temporally dependent information to determine and prioritize retransmission/forwarding of the data sample. No limitation is intended nor should it be implied by any particular example given here.

Converting from Utility to Microutility

The strategy sublayer plays the crucial role of translating the more expressive utility functions to the more practical microutility functions. As explained earlier, it uses a dithering approach, where each data sample will receive a different microutility, but groups of microutilities will approximate the full utility. To do this the strategy sublayer precomputes a set of microutilities that will optimize the utility function supplied by the application based on the currently available network resources. Note that strategy generation only needs to take place at the data source, and can take place periodically and without the real-time constraints the system.

Under most operating conditions, the forwarding operation does not need to generate a new microutility, only evaluate the microutilities traveling with the data sample. In some rare circumstances, a forwarding node may revise the microutility when it determines that the assumptions of its creation at the source have changed. This revision may be accomplished by modifying the utility of the data sample, which in turn has an effect on the microutility. However, this is generally not expected to occur in most application scenarios, since the microutility generated at the source already contains all of the information necessary to allow a forwarding node to react properly to unforeseen congestion.

In one embodiment of a strategy generation, the strategy sublayer prepares to generate individual microutilities with the following pre-computation steps: sector choice, traffic normalization and quantization of distance, and quantization of utility. Sector choice is based on the relevance function $r(\vec{x}_r, \vec{x}_s)$, which is either a local traffic flow model, or an alternative function supplied by the application writer. The sector choice algorithm tries to identify sectors with a usually high relevance. If no such sectors can be identified then updates will be sent omni-directionally, that is, with a sector of 360 degrees. Even when sectors have been identified, it is often useful to send some omni-directional updates to cover lower relevance areas.

Sectors are found by first computing relevance as a function of angle around the source, $r(\theta)$. Then locally maximal peaks in $r(\theta)$ are selected, provided they exceed a predetermined threshold. Peaks are expanded to full sectors by including adjacent values of $\theta$ for which $r(\theta)$ still exceeds a second, smaller threshold. In some instances, the expanding peaks may merge to form larger sectors. Once the sectors are identified, the steps in the next few sections are performed for each sector.

Once a sector is chosen, the system chooses a sequence of radial distances $z1, z2, z3, \ldots, zn$ so that the traffic necessary to spread updates in the sector between each of the $zj$ and $zj+1$ are nearly equal. If the angle of the sector $\theta$ is large, the system would expect spacing of $zj$ to decrease with distance from the origin to compensate for the increasing length of the arc at $zj$.

It is also possible to quantize the frequency of updates received, f, uniformly into $0, f1, f2, B, \ldots, fm$, where fm is chosen large enough to be in the region where the utility is nearly flat (so there is no reason to send more frequently than fm) The utility function U is bucketed into an array $U_{ij}$ by integrating (approximately if necessary) the two-part utility equation between $zj-1$ and $zj$ in the sector. $U_{ij}$ is the utility of delivering updates at frequency $f_i$ to the sector between $zj-1$ and $zj$.

One can compute the marginal of U with respect to f:

$$\hat{U}_{i,j} = U_{i,j} - U_{i-1,j}$$

The marginal $\hat{U}$ can be interpreted as the additional benefit of adding more data delivery at distance $zj-1$ through $zj$. The marginal utility will play a central role in the optimization problem. Intuitively, it is best to deliver data where the marginal utility is highest, and when a delivery plan is optimal the marginal utilities of all possible "improvements" should be roughly equal.

A cost C* is determined for the bandwidth needed by each "cell" in the quantization of preceding sections. The same cost can be used for each cell because the traffic was normalized and frequencies were evenly spaced. In normal economic systems cost would be determined by a market. To simplify the system a cost setting mechanism may be employed. For a given cost, c, the strategy sublayer will compute a pattern of microutilities that will cover some of the cells $\hat{U}_{i,j}$ shown in FIG. 11. This discussion refers to the number of cells covered as d(c), the demand at c. The discussion of the computation of d(c) and will be deferred to first describe the determination of C* given d(c).

When provided with a new utility function, the strategy sublayer computes strategies for a regularly spaced set of thresholds c. These regularly spaced thresholds approximate a demand curve d(c), which is the number of cells, or amount of network traffic, that will be requested for a given cost. Based upon this, it is possible to select from different methods to set the cost C* or marginal utility.

Using basic split cost, it is assumed that all of the neighbors are identical data sources. The cost splits the traffic evenly among n neighbors. All neighbors are assumed to have identical demand curves and will arrive at identical cost.

The basic split cost may have some limitation when the neighbors have different information sources with different utility functions and consequentially different demand curves. When different nodes have different costs, it is possible to reconcile the costs in the local neighborhood. Each node computes its own cost based upon its own demand curve. It also computes a local weight based upon the slope of its demand curve at the cost computed just previously. This pair of cost and weight is communicated within the local neighborhood.

Each node can now compute a new cost by a weighted average. The new cost is a sum of each weight multiplied by each cost, divided by the sum of each weight. This computation approximates the 'equilibrium' cost that a market might reach by assuming that the demand curves are linear near the equilibrium point. However, unlike a market, it has the advantage that it is reached immediately via the weighted average computation. An additional refinement may be available if there is some "spillover" of information into neighboring regions due to the longer distance microutilities generated in the strategies. It is possible to propagate a portion of the local cost to neighboring regions to influence the spillover of traffic.

This cost is an internal variable of the system, it will not necessarily be charged to users of the system. However, this cost may be a useful input in a subsequent procedure to determine charges to users of the system.

Once a cost C* is determined, strategy generation can be viewed as an economic choice: choose a set of cells so that the utility is greater than the cost. The cells must be chosen to form a convex region, as shown for example, in FIG. 1, so that they can be covered by a pattern of microutilities. If the marginal utilities $\hat{U}_{ij}$ are decreasing in both i and j, as illustrated in FIG. 1, then the economic choice is simple: choose the cells in $\hat{U}$ where the marginal utility is greater than the cost. This situation will be considered first.

Figure 11:
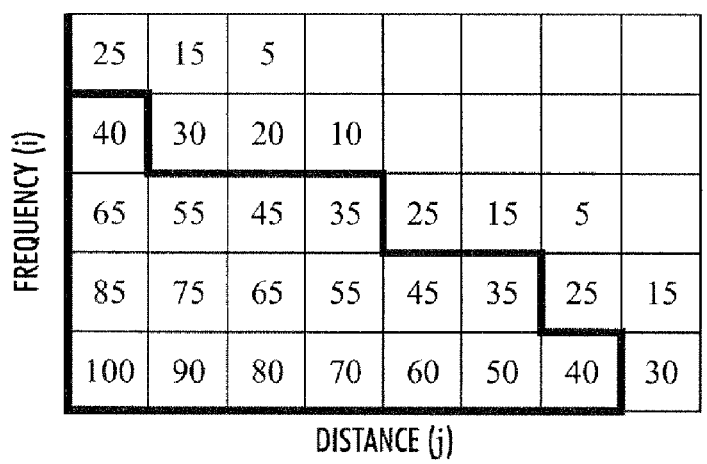
FIG. 11 shows a pattern of microutilities for quantization cells.

FIG. 11 illustrates $\hat{U}_{ij}$; the bold line enclosed region encloses all cells above the cost C*=32. The enclosed region can be interpreted as suggesting that the best way for this application to spend 18 "units" of bandwidth is to send 80% of its data samples as far as z1, 60% as far as z4, 40% as far as z6, 20% as far as z7, and nothing beyond z7.

Figure 12:
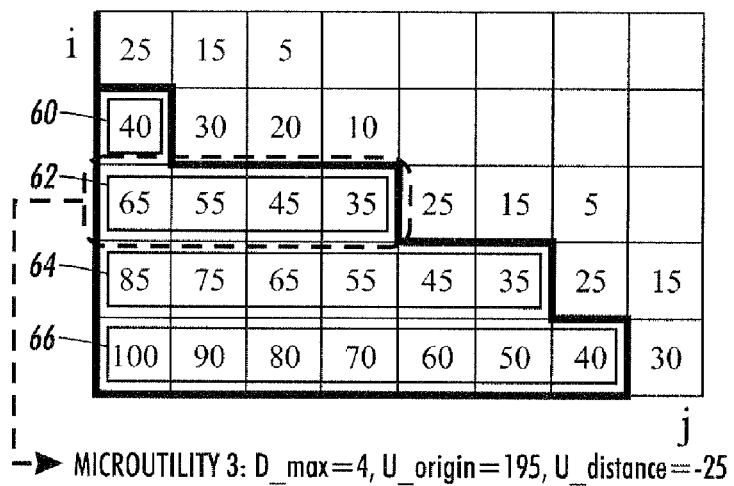
FIG. 12 shows an embodiment of a specific microutility as applied to quantization cells.

In preparation for generating individual microutilities, the system computes the length of the horizontal rows that are above the cost threshold. Define g(i) for each i as the largest j such that $\hat{U}_{i,j}$ is still greater than cost C*. For FIG. 11, g(1)=7, g(2)=6, g(3)=4, g(5)=1, g(6)=0. The geometric domain of the microutilities will be chosen uniformly from the zg(i). That is, the planned distance of travel for a data sample with microutility i will be D(i) max=zg(i). The sequences $\hat{U}_{i,1}$, $\hat{U}_{i,2}$, $\hat{U}_{i,3}$, ..., $\hat{U}_{i,g(i)}$, indexed by i, will together tile the lower left corner of $\hat{U}_{i,j}$, covering all the cells with marginal utility greater than cost C*. FIG. 12 shows the microutilities as the horizontal rectangles 60, 62, 64 and 66.

If the marginal utilities do not decrease in i and j then the procedure to choose cells must be modified. It will be understood that for any value of C, that a shortest path or dynamic programming algorithm can be used to find a sequence of values g(1), g(2), g(3) that, for the region left of the g(i), maximize the utility of cells minus the cost of the cells. Such an algorithm does not require that the careful choice of the zj to make the costs uniform per cell, as it can determine a cost and utility for each possible strip g(i). The relationship between utility and cost of bandwidth can be used to determine a pattern of microutilities such that a sum of the utility minus the cost of bandwidth is increased when comparing patterns of microutilities.

Choosing zg(i) uniformly in i is the generally surest way that the forwarding sublayer delivers the most useful information to vehicles. However, it presumes that the costs are well-understood at the time and location where the data is generated. To handle cases where unexpected congestion exists in some region or time period, one also needs to generate dynamic priority functions. Here, the dynamic priority should approximate the marginal utility that would be lost if a sample were dropped. One can compute this "remainder utility" by summing the marginal utility in the remaining cells:

$$\hat{U}_{i,j}^R = \sum_{k=j+1}^{p(i)} \hat{U}_{i,j}$$

and then fitting a line to the (zj, $\hat{U}_{i,j}^R$) This line determines the intercepts Uorigin and Udistance in the dynamic priority portion of microutility i. The additional intercept, Utime, which governs the amount of value the microutility would loses due to a delay, is found by using the same slope from Uorigin to Udistance, as is observed on average in the utility function U, that is:

$$E_{f,d} \frac{\partial}{\partial_\tau} U(f, \tau, d).$$

FIG. 12 illustrates a set of microutilities, assuming evenly spaced zj=j. So for microutility 3, a line was fit to the remainders of row 3: (0, 200), (1, 135), (2, 80), (3, 35).

Finally the system completes the strategy generation process by establishing a uniform pattern of microutility generation by choosing a permutation p, with p(1)=1 to insure that the first microutility is the strongest microutility. The above strategy algorithm has the property that the furthest-traveling microutilities also cover the cells with the highest marginal utilities, and so will have the highest dynamic priority. It is also possible to generate a more randomized tiling of the $\hat{U}_{i,j}$ array when fitting the dynamic priority portion of the microutility.

To generate microutilities the system maintains an index k, into the microutility strategy permutation p. When the application supplies a new data sample, a microutility is generated with range D(p(k)) max and microutility given by U(p(k)) origin, U(p(k)) distance, and U(p(k)) time as precomputed above; k is incremented modulo the set size for subsequent microutility generation.

If an application's data samples change dramatically then an application can reset the microutility generation. This is accomplished by setting k=1, thereby ensuring that the strongest microutility is the next microutility sent.

Congestion Management

The forwarding sublayer is the central decision-making layer. It receives data updates, evaluates their microutilities, and uses the following values to make decisions about further handling of the data.

If the data item is within the geometric domain of its microutility, then the data item is delivered to any local applications interested in the data. This is accomplished by passing the data "up" the protocol stack shown in FIG. 2 to the application layer. In some implementations, it may be desirable to always deliver received data to the application, even if it is outside the geometric domain, since the cost of sending the data has already been incurred.

If the data item's microutility is less than or equal to a "drop threshold" then the data is dropped or discarded. This is an important reactive step that keeps the peer-to-peer network operating efficiently when local congestion is detected. If the data item's microutility is above the drop threshold then it is broadcast in the local neighborhood.

On certain nodes, with long-range media capability, if the data item's evaluated microutility is above a higher "premium threshold" then in addition to broadcasting locally it is also transmitted longer distances, using, for example, fixed wired or wireless infrastructure.

If the data will retain its value over time, then the data is stored locally for potential future forwarding at a later time (store-and-forward).

Figure 13:
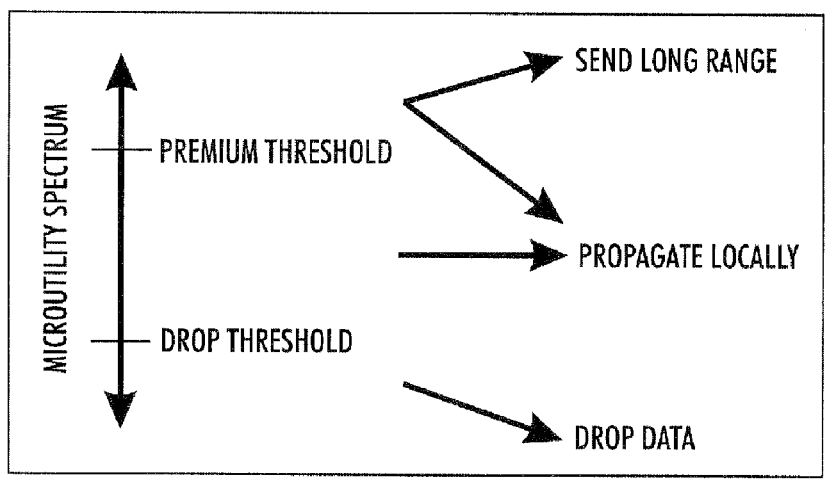
FIG. 13 shows an embodiment of propagation options for propagation of information.
Figure 14:
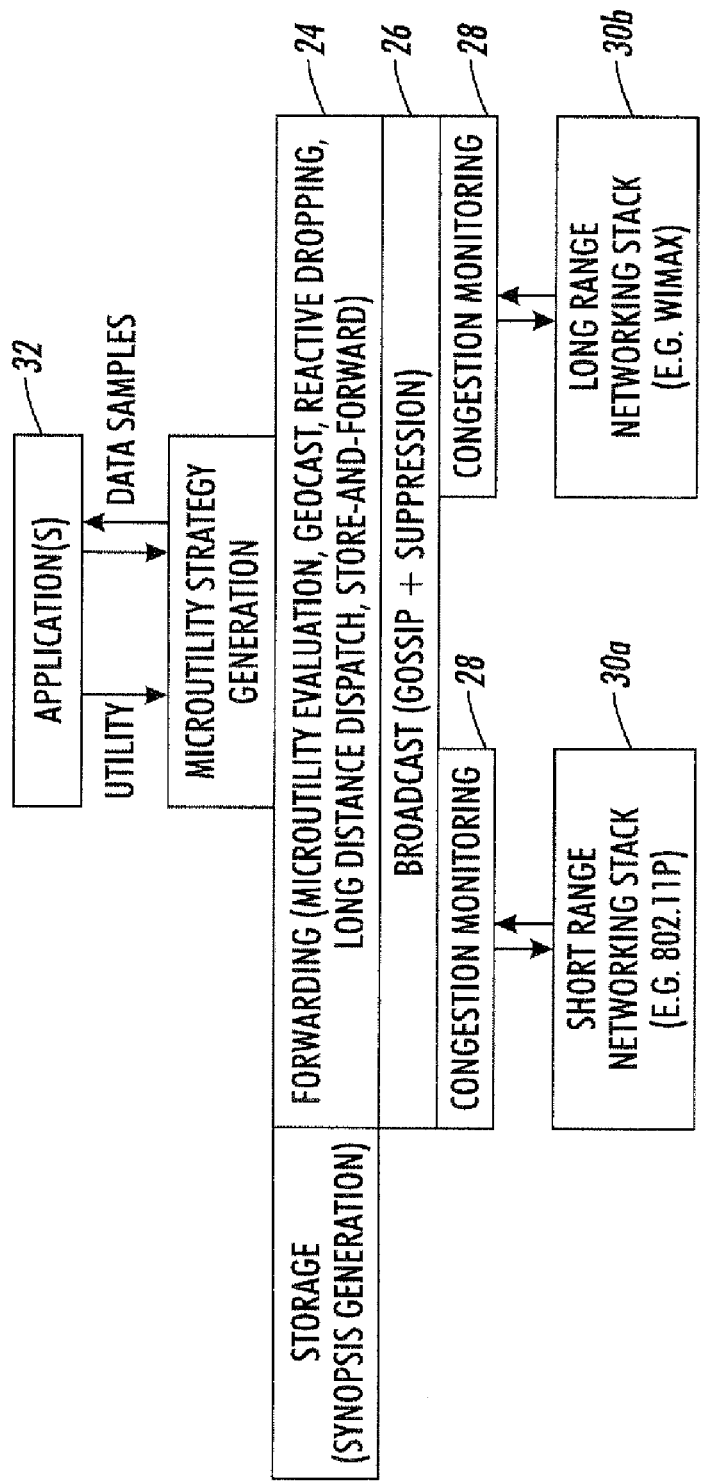
FIG. 14 shows an embodiment of an information layer with an expanded view of a forwarding sublayer.

All of the above decisions are guided by microutility. The immediate propagation options are diagrammed in FIG. 13. FIG. 14 shows the protocol stack with the additional role of the forwarding sublayer expanded.

When congestion is detected the drop threshold is increased so that less data is forwarded, and using microutility means that it is the less valuable data that will be dropped. Data samples are evaluated individually, but the variations in microutility among data sources means that dropping will intelligently winnow streams of data samples from the same source.

Figure 15:
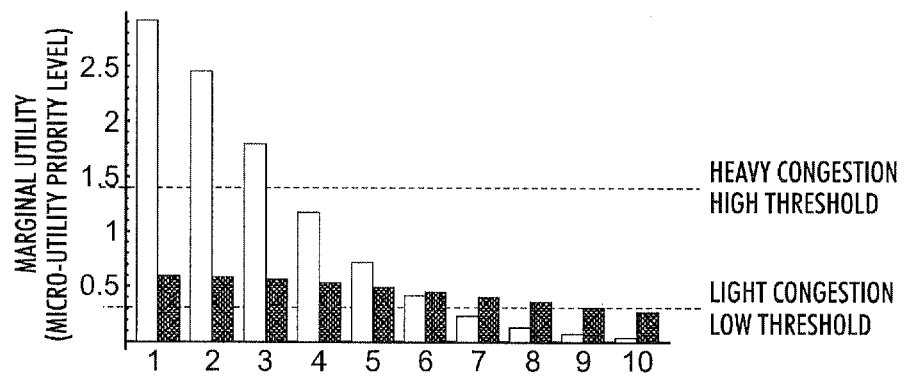
FIG. 15 shows an example of thresholds used in congestion management.

Referring to FIG. 15, assume that there is a node that becomes unexpectedly congested. The node establishes a threshold and discards all data samples with priority less than the threshold. With high levels of congestion, the congested node must establish a higher threshold to remove more traffic. In FIG. 15, this results in forwarding of only 30% of the traffic for data stream A (left bars), and none of the traffic from stream B (right bars). If there is low congestion, the low threshold would forward 60% of the traffic from stream A and 80% of the traffic for stream B.

It must be noted that the above approach works more effectively than a fixed priority approach, which would assign a high but fixed priority to data stream A. This would cause the node to solve all congestion problems by discarding data from stream B, eventually completely suppressing that stream. The microutilities vary from one microutility to the next and can find better solutions. The result is a drop decision that is just as simple as those for fixed priorities, but achieves most of the benefits of full utility functions with little cost or overhead.

While the microutilities determine which data is dropped, it is the level of the drop threshold that determines how much data is dropped. The drop threshold is set based on a measure of local congestion. This control mechanism will be described later with reference to the congestion monitoring sublayer.

The smooth functioning of a network often requires careful management of load. This is important for carrier-sense wireless peer-to-peer networks, since, carrier sense is never perfect, and high loads will cause unanticipated collisions will degrade throughput. In scheduled networks, this can be even more critical, since there are only a fixed number of slots available and it would be undesirable to fill them completely, leaving no space for late-arriving critical packets.

When managing traffic at a local node, it is important to consider traffic at neighboring nodes, which may have much higher loads. It has been found that the local queue length at the MAC layer in the 802.11 protocol stack is a good measure of congestion in the neighborhood. Even if the local load is light, high levels of traffic at nodes within a few hops will be detected by the carrier sense, causing the local queue to fill. The nodes may exchange information as part of data sample packets, an explicit management packet or out-of-band (i.e., not in a packet). This information may also be contained in a repository or database, as part of the previously-provided traffic information. Further, exchanges between nodes may be authenticated or encrypted.

Moreover, if the system measures local queue length (QL), and controls to keep local queue length short, then the system can make important drop decisions and gossip suppression decisions higher up in the protocol stack, before the packet is released to the MAC layer, where its eventual transmission is inflexibly determined by the lower-level protocol (beyond the control of the information layer) while it waits in the MAC queue. At the Information Layer, in addition to the data sample being dropped or propagated, the data sample may be propagated after being temporarily delayed.

The congestion measurement is used to control the forwarding sublayer. This is accomplished by varying the dropping threshold, which may be accomplished by many mechanisms. For example, the system might use an exponential function of local queue length, proportional to $QL^{1.5}$, to set the drop threshold. This allows the system to permit extremely high-utility packets to temporarily raise the congestion level, but limits the amount of that increase due to the rapid increase of the threshold as congestion goes up. The actual increase in the threshold is set according to a calibration mechanism. This mechanism maintains a measure of the mean and standard deviation of recently received microutilities, evaluated at the forwarding node's location at the current time. Knowing this information allows the threshold to be set such that a specific amount of traffic can be dropped, within the accuracy of the approximation of the calibration approach. Other calibration techniques might include keeping more detailed statistics of microutilities, histograms of received microutilities, or more detailed information about how microutilities are varying over time.

Other measures, such as local queue delay, and packet-size weighted queue length are closely related to queue length, and may be more accurate measures of congestion. These are also easily measured by a congestion sublayer that can observe each packet as it is released to the network stack, and can establish a monitor on each packet as it is transmitted from the MAC layer. Further, other measures of queue length, such as average queue length and aggregate queue length may also be used. Historic measures may also be used, such as historic packet-size weighted queue lengths, where recent packet-size weighted queue lengths have a larger effect on the determined local data traffic level than less recent queue lengths. This can be applied to any congestion measure mentioned above.

The neighborhood congestion measurement can be further extended to a 2-hop neighborhood by piggy-backing the local measurement of queue length in the header of outgoing packets. This is easily accomplished by the congestion monitoring sublayer at this location in the protocol stack: it inserts and recovers measurements from the packet headers, it does not otherwise modify the packets. The measurements from packet headers of neighboring nodes may be combined with the measurements for the local node to determine the local data traffic level.

It is possible to devise more precise control mechanisms than $QL^{\wedge}1.5$ that can manage queue length to more consistently maintain a chosen queue length. These methods would involve, for example, feedback mechanisms using the difference between the current measured queue length and a desired queue length, taking advantage of traditional feedback control system design and analysis techniques.

Similarly, while the criterion for dropping data samples is discussed as being a threshold, it is possible that other criteria may be used as well. The local data traffic, which may or may not include neighboring node traffic, is used to define a criterion for congestion. This criterion is then applied to the microutility to determine which data samples, if any, are to be dropped. For example, the microutilities of recently received data samples may be used to determine the criteria. These recently received microutilities may also be used to rescale the microutility for a current data sample prior to applying the criteria to that microutility.

Utility Guided Media-Agility

For the fixed nodes of the network (for example, stop lights, road signs, etc.) the system has included in the design a longer range fixed wireless capability such as WiMax.

Because such longer-range radio transmissions cover larger areas, they consume more spatial bandwidth (i.e. bandwidth-area). They are consuming a scarcer resource and hence a premium threshold is used to route only the most valuable data items through the long range media. Like the drop threshold, the premium threshold is set based on a local measure of congestion in the long-range channel. Any of the measures of local data traffic levels discussed above may be used to determine the media through which data samples will be propagated.

The longer range medium will have its own lower level protocol stack, but will share the forwarding sublayer and broadcast sublayer as shown in FIG. 14. Even data items that have passed above the premium threshold, or have met some other criteria of which a threshold is one example, and are routed via the long range channel are still processed by the forwarding sublayer at the recipient. In particular, they must be above the premium threshold, after each long range hop, to continue propagating in the long range channel. Note that being above the premium threshold does not suppress simultaneous transmission of the data via the normal vehicle-to-vehicle radio protocol. Information propagation occurs via both methods, and any redundancies are prevented via the normal broadcast sublayer mechanisms.

Additionally, the long-range and standard media may be associated with different ranges of microutilities. For example, data samples below a certain threshold will be dropped. Data samples having microutilities in a particular range may be propagated in only the standard medium, microutilities in a different range may be propagated only in the premium medium, with yet another range of microutilities being propagated in both media. Variations and combinations between ranges and the channels are left up to the implementation for particular systems. In addition, since the evaluation of microutilities is based upon the characteristics of the node at which the evaluation is being performed, each relay node may repeat the above process of determining the media for transmission.

In addition to using the microutility to select the media, the characteristics of the media and the nodes connected by a particular medium may determine the transmission of the data sample. One characteristic already implied is that the media are characterized by the nodes connected by each particular medium. This information may be exchanged between nodes connected to a particular medium, or may be the result of nodes registering with a central repository that maintains the context of each node. The implementation of the exchange may depend upon the medium. The subset of nodes connected to a particular medium may be only direct peers, some strict subset of nodes or all nodes. This 'node context' may change over time and updates may be propagated to interested nodes, such as those still connected to that particular medium.

In addition, the characteristics of the media used to guide the selection of the transmission media may include an evaluation of the microutility at the remote end of a connection through the media. For example, in an infrastructure system a node could be connected via a point-to-point link to a remote node. In this instance, there is no reason to send an update over the point-to-point link if it will have zero utility at the receiving node.

The characteristics of the media may depend upon the transmitting node, the receiving node, the nature of the data being transmitted and the condition of the channels in the media. For example, In a long range microwave system a node A may have two neighbors B and C. The link to the near node B may support high-speed data transfer while the link on the far node C may only support low-speed data transfer. The transfer rate may also be chosen based on interference noise detected by the system at the time of transfer.

Other characteristics may also play a factor in the selection of the media for transmission. The characteristics of the media may determine the number of samples included in a packet, and determine encryption and security requirements.

In addition, the management of updates, congestion and store and forward implementations may be affected by the selection of the media. For example, transmission of data samples through the media may be controlled such that duplicate samples are detected and suppressed on each media, unless a hold is in use. The suppression mechanism may be media-dependent, and hold-and-forward mechanisms may be independent from hold-and-forward mechanisms used in other types of media.

Store-and-Forward

Store-and-forward addresses gaps that will naturally develop in the peer-to-peer connectivity of the network. In urban areas, traffic lights will bunch vehicles together around the traffic lights, but may leave gaps in the mid-block region. Furthermore, these bunches will often persist as vehicles travel between intersections. In rural areas the low densities of vehicles will create transmission gaps.

Figure 16:
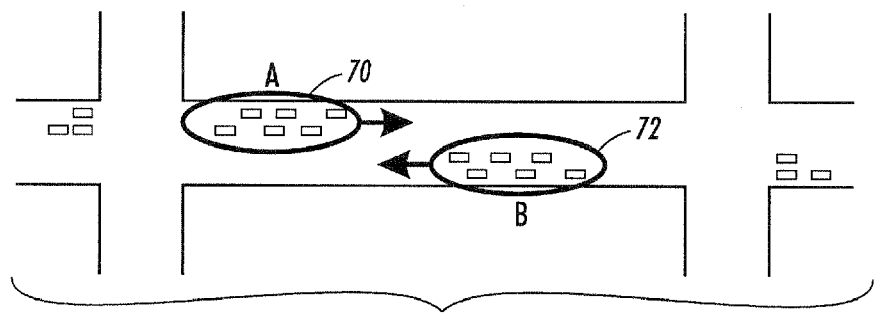
FIG. 16 shows an embodiment of a network having groups of nodes in close proximity.

FIG. 16 illustrates a scenario caused by traffic lights that have bunched the vehicles together. While data generated in group A 70 will propagate rapidly to all vehicles in group A, the flooding of some data items within group A will be complete before vehicles in group A move within range of group B 72. This would result in those data items never reaching group B. In these kinds of scenarios, coverage can be greatly improved by storing the updates briefly in the vehicles as they move, and passing them to other vehicles encountered later.

The challenge of store-and-forward techniques is to determine when a stored update should be forwarded again. If vehicles simply periodically rebroadcast updates they are storing, then considerable additional traffic is generated and this extra traffic may be entirely unnecessary, for example, when the initial propagation has traveled through a well connected network and successfully reached all recipients. Even when rebroadcasts are necessary, they may be necessary only at certain times, for example, when group A first encounters group B in the middle of FIG. 16. Once a stored update is received by the new node, it is made available to the application via the normal mechanism for received data.

Rather than periodically rebroadcasting updates, one may instead use a synopsis approach. A synopsis is a highly compressed representation of the contents of a node's stored updates, these stored updates being referred to here as a "hold." In the synopsis each update being stored in hold is represented in abbreviated form, such as by a hash function. In one embodiment already implemented by the inventors, each update is represented by only 8 bits, which is a considerable savings over the size of a full data sample, which can be 500-2000 bits or more. In this embodiment, each node periodically piggybacks a synopsis on a regular outgoing update message. Recipients of the synopsis compare it with their own stored update synopses in order to determine which updates are missing in their neighbor's hold, and rebroadcast only those updates.

This is sometimes referred to as "anti-entropy" or "set reconciliation problem." Updates from the same data source will be time stamped, and in most applications a node only wishes to retain the most recent update with the most recent time stamp from a source. This may be referred to as obsoleting semantics, and obsoleting semantics will be assumed in discussion that follows, as it is the more difficult case to handle. However, the method described here can also support data types with non-obsoleting semantics or a mix of obsoleting and non-obsoleting semantics by retaining all updates from each source while they continue to have utility above some threshold, and considering them as separate entities for purposes of synopsis generation and comparison and hold and forward. In the case of obsoleting semantics, received data is only provided to the application if it is more recent than the updates already provided to the application.

In one embodiment, it is possible to solve the set reconciliation problem efficiently with a sorted-list synopsis. In such an architecture, microutilities give a natural way to sort the updates. Furthermore, by reconciling the highest microutility differences first, it ensures that scarce transmission resources are allocated to the most valuable rebroadcasts. Sorted updates allow efficient comparison of synopses with the local hold and simplify prioritization of updates.

Figure 17:
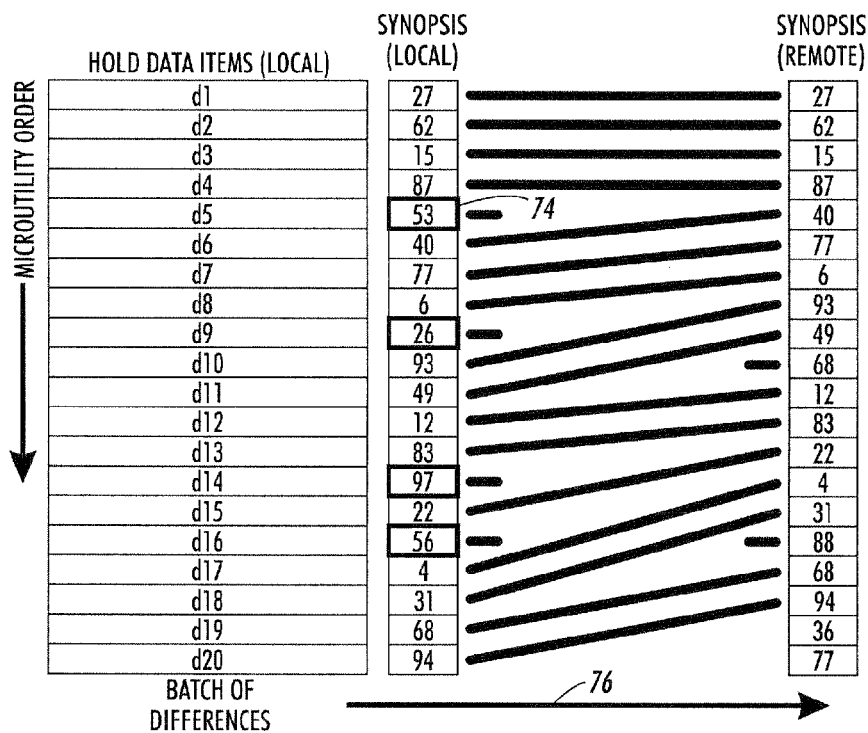
FIG. 17 shows an embodiment of a local synopsis being compared to a remote synopsis.

A sorted-list synopsis is constructed by sorting the updates into microutility order and computing a short hash of the stream ID and the timestamp for each update. This list of hashes is sent as a synopsis. FIG. 17 shows a synopsis of the data items in local storage being compared to a synopsis received from a remote sender.

The comparison of two synopses may be computed with a Levenshtein distance algorithm. The Levenshtein distance is the minimum number of "edits," insertion or deletion of a character, that are necessary to make two strings equal. In this application the Levenshtein distance computation identifies updates that differ between two different holds.

Figure 18:
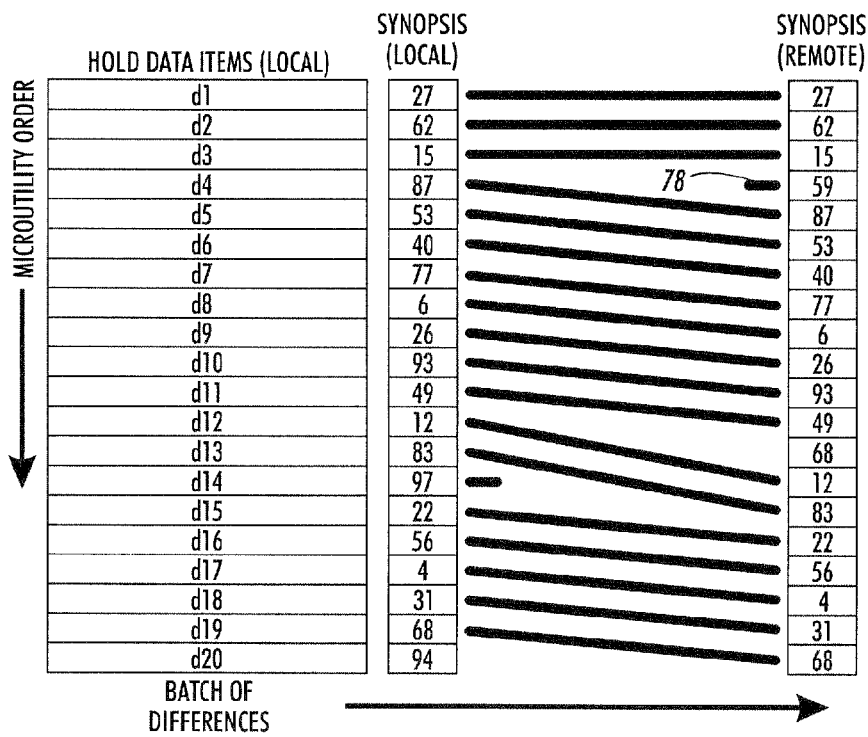
FIG. 18 shows an embodiment of a local synopsis having a difference from a remote synopsis.

After comparison, the action taken depends on the results of the alignment. If the local node holds the first unmatched difference in the sort difference, as shown at 74 in FIG. 17, then the local node transmits a batch of differences from its storage. FIG. 17 shows 4 differences being sent. The minimum and maximum number of differences to be included in such a batch are parameters that can be set in this algorithm. If the remote synopsis holds the first (highest microutility) difference in the sort difference, as shown at 78 in FIG. 18, the local node sends its synopsis by adding it to the next outgoing packet. This sent synopsis will likely provoke the remote node, after it does a synopsis compare, to send differences back to the local node.

The reason for this asymmetry is that the when two nodes hold different age updates from the same source, one would like the most recent update to be reconciled between the two nodes. The most recent update will have the highest microutility, so it is more probable that the first difference will be sent in the right direction. The protocol sends a batch of differences, so this will not necessarily be true of the second and subsequent differences in a batch. Batches are sent for efficiency; it is still likely that subsequent differences in a batch will also be beneficial to the recipient.

Updates sent from hold in response to a synopsis mismatch are broadcast on the appropriate media, just like regular updates being forwarded. Because of the broadcast nature of the updates, they may reconcile multiple holds at the same time in the 1-hop neighborhood. Due to the queuing and delays of packets already released to the MAC layer, a node may receive a stale synopsis from a neighbor after it has already re-broadcast an update from hold. To avoid multiple unnecessary re-transmissions, a node will place an update in a brief hold-down after sending it from hold. This avoids multiple re-transmissions due to stale synopses.

The summarized updates contained in the synopsis are so compressed that they may occasionally "collide" accidentally, that is, they will match when they should not match: two different data items will match in the comparison algorithm. However, this failure should be rare. The consequence of these failures is that a small amount of unnecessary traffic will be transmitted, but it has no effect in terms of correctness or freshness of the data in the hold.

The updates stored in hold may be kept sorted with any sorting algorithm. Shell sort has been found to be especially effective, because it is very efficient when the lists are already almost correctly sorted. This will often be the case, since the microutilities change very little between sorts. Moreover, the system only reevaluates the microutilities at a limited number of locations on a regular grid, that is, it quantizes the space and time coordinates of vehicles to a regular grid. This limits the number of times hold needs to be sorted, and increases the likelihood that neighboring nodes will have the same sorted order. The system evaluates the dynamic priorities using these quantized parameters. It is possible that the node transmitting the synopsis may include the quantized parameters with the synopsis, so the receiving node can use the quantized parameters to compare the received synopsis with the local synopsis. The local node can also use the quantized parameters to sort the local storage.

The alignment, such as Levenshtein distance, uses dynamic programming to find the alignment with the fewest unmatched items, it normally takes $O(n^2)$ time and space, where n is the length of the lists begin compared. This embodiment has modified the traditional algorithm so it finds the first small number of differences between the two lists. In one possible implementation, the traditional Levenshtein distance algorithm systematically computes a n by n matrix where the (i,j) entry represents the best alignment between the first i characters in one string and the first j characters in another string. Entries far off the diagonal, that is, where |i−j|>k, must have distance >k, since at least k edits are necessary to make these substrings have the same length. An algorithm, such as our synopsis comparison algorithm, that is searching for a small number of differences between two lists does not need to compute any of the entries far off the diagonal, and so can compute the distance more efficiently in O(k n) time and space.

The store-and-forward operation includes several rate-limiting mechanisms to ensure that synopses are not sent too frequently and updates are not rebroadcast too frequently. For example, one way to rate limit the frequency that synopses are sent is to record when the last synopsis was sent, and not send a new synopses until small fixed period of time has elapsed. There is, however, one important limiting mechanism called Limbo.

Figure 19:
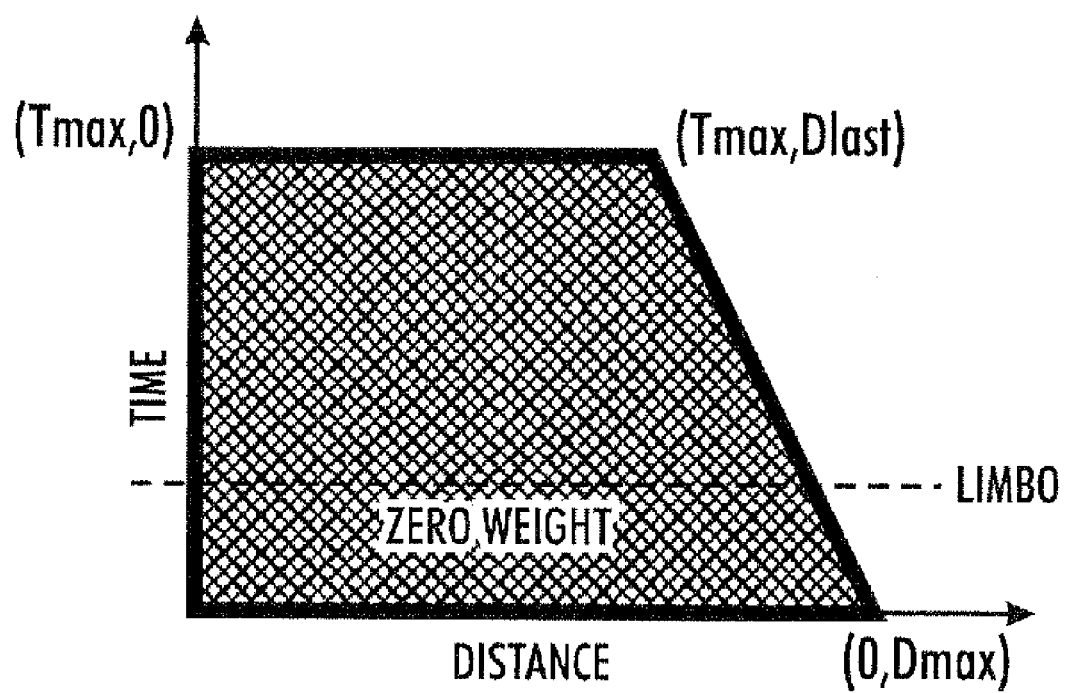
FIG. 19 shows a graphical representation of a time-base limbo holding interval.

Limbo governs the store-and-forward operation. When an update is first generated and initially propagated through the network, it will normally be placed in the hold of all recipient nodes. The system does not wish to have store-and-forward operations begin immediately, in order to avoid sending samples which might be received via normal peer-to-peer transmission mechanisms, so a delay time, which will be referred to as limbo, is applied to all recently generated updates. If the elapsed time since data generation is less than the limbo time, then for purposes of store-and-forward operation, the microutility is assumed to be zero and these recently generated updates are sorted to the bottom of a node's hold and will not appear in the synopses generated. FIG. 19 shows the limbo line on the time-space domain of the microutility.

Limbo may be defined as a fixed time relative to the time the data was generated. Limbo prevents store-and-forward operations from beginning too quickly. It allows the initial propagation of the update to spread to all nodes within good multihop connectivity. During initial propagation there are many brief inconsistencies that will be resolved almost immediately. Premature store-and-forward synopses comparison of these updates would respond to many temporary inconsistencies rather than fixing more serious longstanding inconsistencies. Limbo reserves store-and-forward operations for older updates, which have already had a chance to be exchanged among nearby nodes.

While the criteria for limbo used here is related to a time the data was generated, one skilled in the art knows that limbo can be any number of criteria that temporarily prevent store and forward operations to avoid addressing inconsistencies that will resolve themselves in a short period of time.

Limbo also keeps updates from well-connected nodes from ever participating in store-and-forward operations. In the well-connected situation, before an update can leave limbo and begin participating in store-and-forward, it will be replaced in limbo with another update from the same source with even less elapsed time, as per obsoleting semantics. Updates will only leave limbo when connectivity gaps develop and the source becomes disconnected from its intended recipients.

It will be appreciated that various of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

The invention claimed is:

1. A method of managing traffic in an ad-hoc network, comprising:
   receiving, at a local node, a received synopsis of updates to data contained in data samples in a neighbor storage of a neighboring node, wherein the received synopsis is a list of compressed representations of data sample updates stored at the neighboring node and sorted using dynamic priorities associated with the data samples,
   wherein a data sample is individual portion of data generated by applications on data source nodes;
   generating a local synopsis of data sample updates in a storage at the local node;
   comparing the received synopsis with the local synopsis of data sample updates in a local storage of the local node; and
   determining which data samples the local node will transmit based upon the comparing, and
   wherein generating the local synopsis further comprises:
   computing a hash of some portion of information associated with a data sample, and computing a hash of a stream identifier associated with a data source and a timestamp for each update to produce a list of hashes representing the updates stored in the local storage.

2. The method of claim 1, the method further comprising combining the received synopsis with an update message to form a piggybacked update message.

3. The method of claim 1, the method further comprising storing data sample updates by only storing a data sample update for one or more data source streams having the most recent time stamp.

4. The method of claim 1, further comprising storing the updates until the dynamic priorities associated with the updates become less than or equal to a threshold.

5. The method of claim 1, wherein the received synopsis is sorted on the local node based at least in part on criteria that will sort recently generated data samples to the bottom of the local storage.

6. The method of claim 1, wherein the local synopsis is sorted on the local node based at least in part on criteria that will sort recently generated data samples to the bottom of the local storage.

7. The method of claim 5, wherein the criteria assigns updates a value zero until a predetermined time period has elapsed.

8. The method of claim 6, wherein the criteria assigns updates a value zero until a predetermined time period has elapsed.

9. The method of claim 1, the method further comprising:
   when the local node holds a first unmatched difference in a sort order, transmitting a batch of differences from the local storage.

10. The method of claim 9, the method comprising limiting a rate at which batches of differences are transmitted.

11. The method of claim 1, the method further comprising:
    when the received synopsis holds a first unmatched difference in a sort difference, transmitting a local synopsis to the neighbor node.

12. The method of claim 11, the method further comprising limiting a rate at which synopses are transmitted.

13. The method of claim 12, wherein limiting the rate further comprises limiting the rate based upon microutilities.

14. The method of claim 1, wherein comparing the received synopsis to the data sample updates in the local storage further comprises computing a Levenshtein distance to determine the minimum number of changes necessary to synchronize the received synopsis and the data sample updates in the local storage.

15. The method of claim 9, wherein transmitting a batch of differences further comprises transmitting a predetermined number of differences in the batch.

16. The method of claim 11, the method further comprising receiving a batch of differences from the neighbor node after transmitting a local synopsis to the neighbor node.

17. The method of claim 1, the method further comprising evaluating dynamic priorities on the local node using quantized parameters that are quantized in space or time.

18. The method of claim 17, wherein the quantized parameters used to evaluate the dynamic priorities are received with a received synopsis.

19. The method of claim 17, wherein comparing the received synopsis with the data sample updates in the local storage further comprises comparing the received synopsis using the received quantized parameters.

20. The method of claim 18, wherein the storage is resorted by evaluating the dynamic priorities with the quantization parameters received with a synopsis.

21. The method of claim 1, the method further comprising managing resources available for the local storage based in part on dynamic priority.

22. An article of non-transitory computer-readable storage media containing instructions that, when executed, cause the computer to:
   receive a received synopsis of updates to data contained in samples in a neighbor storage of a neighboring node, wherein the received synopsis is a compressed representation of data samples updates stored in the neighboring node and sorted based on dynamic priorities associated with the data samples,
   wherein a data sample is individual portion of data generated by applications on data source nodes; and
   generating a local synopsis of data sample updates stored in a local storage of the local node;
   compare the received synopsis with the local synopsis of data sample updates in a local storage of the local node; and
   determine which data samples the local node will transmit based upon the comparison, and
   wherein generating the local synopsis further comprises:
      computing a hash of some portion of information associated with a data sample, and computing a hash of a stream identifier associated with a data source and a timestamp for each update to produce a list of hashes representing the updates stored in the local storage.

23. The article of claim 22, wherein the instructions, when executed, further cause the computer to combine the received synopsis with an update message to form a piggybacked update message.

24. The article of claim 22, wherein the instructions, when executed, further cause the computer to store data sample updates by only storing a data sample update for one or more data source streams having the most recent time stamp.

25. The article of claim 22, wherein the instructions, when executed, further cause the computer to store the updates until the dynamic priorities associated with the updates become less than or equal to a threshold.

26. The article of claim 22, wherein the instructions, when executed, further cause the computer to:
   when the local node holds a first unmatched difference in a sort order, transmit a batch of differences from the local storage.

27. The article of claim 22, wherein the instructions, when executed, further cause the computer to:
   when the received synopsis holds a first unmatched difference in a sort difference, transmit a local synopsis to the neighbor node.

28. The article of claim 22, wherein the instructions, when executed, further cause the computer to evaluate dynamic priorities on the local node using quantized parameters that are quantized in space or time.

29. A device, comprising:
   a local storage;
   a port to allow the device to receive a received synopsis of updates of data samples contained in a neighbor storage of a neighboring node, wherein the received synopsis is a compressed representation of data samples updates stored in the neighboring node based at least in part on dynamic priorities associated with the data samples,
   wherein a data sample is individual portion of data generated by applications on data source nodes; and; and
   a processor to:
   generate a local synopsis of data sample updates in the local storage of the local node;
   compare the received synopsis with the local synopsis of data sample updates in the local storage of the local node; and
   determine which data samples the local node will transmit based upon the comparison and transmission resources available to the processor, and
   wherein generating the local synopsis further comprises:
   computing a hash of some portion of information associated with a data sample, and computing a hash of a stream identifier associated with a data source and a timestamp for each update to produce a list of hashes representing the updates stored in the local storage.

* * * * *